United States Patent
Onda et al.

(10) Patent No.: US 11,202,962 B2
(45) Date of Patent: Dec. 21, 2021

(54) SYSTEM FOR GIVING REWARD IN EXCHANGE FOR WATCHING ADVERTISEMENT

(71) Applicant: BANDAI NAMCO Entertainment Inc., Tokyo (JP)

(72) Inventors: Akio Onda, Warabi (JP); Daisuke Omori, Tokyo (JP); Makoto Kikuchi, Tokyo (JP); Yuki Matsuba, Kawasaki (JP); Masayuki Oda, Fujisawa (JP); Tatsuya Shioiri, Funabashi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 359 days.

(21) Appl. No.: 15/855,330

(22) Filed: Dec. 27, 2017

(65) Prior Publication Data
US 2018/0178128 A1 Jun. 28, 2018

(30) Foreign Application Priority Data
Dec. 28, 2016 (JP) .............................. JP2016-256824

(51) Int. Cl.
*A63F 13/61* (2014.01)
*A63F 13/79* (2014.01)
*A63F 13/69* (2014.01)
*A63F 13/35* (2014.01)
*A63F 13/92* (2014.01)

(52) U.S. Cl.
CPC .............. *A63F 13/61* (2014.09); *A63F 13/69* (2014.09); *A63F 13/79* (2014.09); *A63F 13/35* (2014.09); *A63F 13/92* (2014.09)

(58) Field of Classification Search
CPC ........................................ G06Q 30/0207–0277
See application file for complete search history.

(56) References Cited

U.S. PATENT DOCUMENTS

| 2008/0307052 A1* | 12/2008 | Krishnan | G06Q 30/0255 709/205 |
| 2014/0128154 A1* | 5/2014 | Asano | A63F 13/30 463/29 |
| 2014/0323189 A1* | 10/2014 | Jhalaria | A63F 13/80 463/9 |

(Continued)

FOREIGN PATENT DOCUMENTS

| JP | 2007-274238 A | 10/2007 |
| JP | 2014-079528 A | 5/2014 |

(Continued)

*Primary Examiner* — Chrystina E Zelaskiewicz
(74) *Attorney, Agent, or Firm* — Posz Law Group, PLC

(57) ABSTRACT

An advertisement that has been watched by a friend but has not been watched by a target player is controlled to be displayed at a timing satisfying a timing condition defining a timing at which the advertisement is displayed, in a game played by the target player. At that time, information indicating that the advertisement has been watched by the friend is also controlled to be displayed. A reward for watching the advertisement is given to the target player. The reward changes in accordance with the number of the friends who have watched the advertisement and a friendship level of the friend. The target player is further notified that the advertisement has been watched by the friend, and thus the reward has changed.

16 Claims, 22 Drawing Sheets

(56) References Cited

U.S. PATENT DOCUMENTS

2014/0358260 A1* 12/2014 Burgin ............... G06Q 30/0277
  700/91
2018/0130092 A1* 5/2018 Nahass ................. A63F 13/352

FOREIGN PATENT DOCUMENTS

| | | |
|---|---|---|
| JP | 2015-066263 A | 4/2015 |
| WO | 01/39067 A1 | 5/2001 |

\* cited by examiner

FIG.11

[REWARD CHANGE SETTING DATA] 358

| CHANGE EXECUTING CONDITION 358a | CHANGED CONTENT 358b | REWARD GIVING NOTIFICATION SETTING DATA 358c |
|---|---|---|
| NUMBER OF WATCHED FRIENDS =1 | GIVEN QUANTITY +1 | THANK YOU FOR WATCHING THE SAME AD THAT YOUR FRIEND (FRIEND NAME ...) HAS WATCHED. WE HAVE INCREASED THE QUANTITY OF THE REWARD |
| NUMBER OF WATCHED FRIENDS =2 | GIVEN QUANTITY +2 | THANK YOU FOR WATCHING THE SAME AD THAT YOUR FRIEND (FRIEND NAME ...) HAS WATCHED. WE HAVE INCREASED THE QUANTITY OF THE REWARD |
| NUMBER OF WATCHED FRIENDS ≧3 | GIVEN QUANTITY +3 | THANK YOU FOR WATCHING THE SAME AD THAT YOUR FRIEND (FRIEND NAME ...) HAS WATCHED. WE HAVE INCREASED THE QUANTITY OF THE REWARD |
| ... | ... | ... |
| FRIENDSHIP LEVEL OF WATCHED FRIEND ≧5 | ADDITIONALLY GIVEN ITEM ID | THANK YOU FOR WATCHING THE SAME AD THAT YOUR CLOSE FRIEND (FRIEND NAME ...) HAS WATCHED. WE HAVE ADDED THE REWARD |
| LEVEL OF WATCHED FRIEND AT POINT OF WATCHING = PLAYER LEVEL ±5 | GIVEN QUANTITY +2 | ...... |
| STAGE OF WATCHED FRIEND AT POINT OF WATCHING = PLAYER STAGE ±2 | ADDITIONALLY GIVEN ITEM ID | ...... |
| ... | ... | ... |

SYSTEM FOR GIVING REWARD IN EXCHANGE FOR WATCHING ADVERTISEMENT

Japanese Patent Application No. 2016-256824 filed on Dec. 28, 2016 is hereby incorporated by reference in its entirety.

BACKGROUND

A reward advertisement has become a popular means for gaining profits in an online game. The reward advertisement is an advertisement that is displayed on an advertisement screen in a computer such as a user terminal, and features a reward given to a user who has watched the advertisement, accessed a website presented by the advertisement, or installed an application presented by the advertisement (see Japanese Translation of PCT International Application Publication No. JP-T-2003-529093 for example).

The content of the reward advertisement does not basically change within a determined advertising period. Thus, a user playing a game watches the same advertisement over and over again. The advertisement could be regarded as an entertainment when it is seen for the first time. However, watching the same advertisement over and over again is nothing more than a cumbersome obligation making the player lose interest in the advertisement. Thus, the user is extremely less incentivized to watch the advertisement despite the reward, and might start skipping the advertisement to be watched or might even feel negative about the advertised product.

SUMMARY

According to one aspect of the invention, there is provided a computer system comprising: at least one processor or circuit programmed to execute as:

controlling implementation of a game;

managing advertisement watching information on each player;

acquiring information on a friend player of a target player;

selecting an advertisement option in the game to be played by the target player;

receiving selection by the target player on whether or not to watch the advertisement option;

determining a reward related to the game, based on whether or not the friend player has watched the advertisement option; and giving the reward to the target player when the advertisement option, selected to be watched by the target player, is controlled to be displayed.

According to another aspect of the invention, there is provided a computer system comprising: at least one processor or circuit programmed to execute as:

making a game progress based on an operation input by a player;

selecting an advertisement option displayed in the game;

determining whether or not a friend player of the player has watched the advertisement option by accessing a management system managing advertisement watching information on the friend player;

receiving selection by the player on whether or not to watch the advertisement option;

determining a reward related to the game based on a result of the determining; and giving the reward to the player when the advertisement option, selected to be watched by the player, is controlled to be displayed.

According to another aspect of the invention, there is a method, implemented on a computer system, the method comprising: on the computer system, making a game progress based on an operation input by a player;

selecting an advertisement option displayed in the game;

determining whether or not a friend player of the player has watched the advertisement option by accessing a management system managing advertisement watching information on the friend player;

receiving selection by the player on whether or not to watch the advertisement option;

determining a reward related to the game based on a result of the determining; and giving the reward to the player when the advertisement option, selected to be watched by the player, is controlled to be displayed.

BRIEF DESCRIPTION OF THE DRAWINGS

FIG. 11 is a diagram illustrating an example of a data structure of reward change setting data.

DESCRIPTION OF EXEMPLARY EMBODIMENTS

Figure 1:
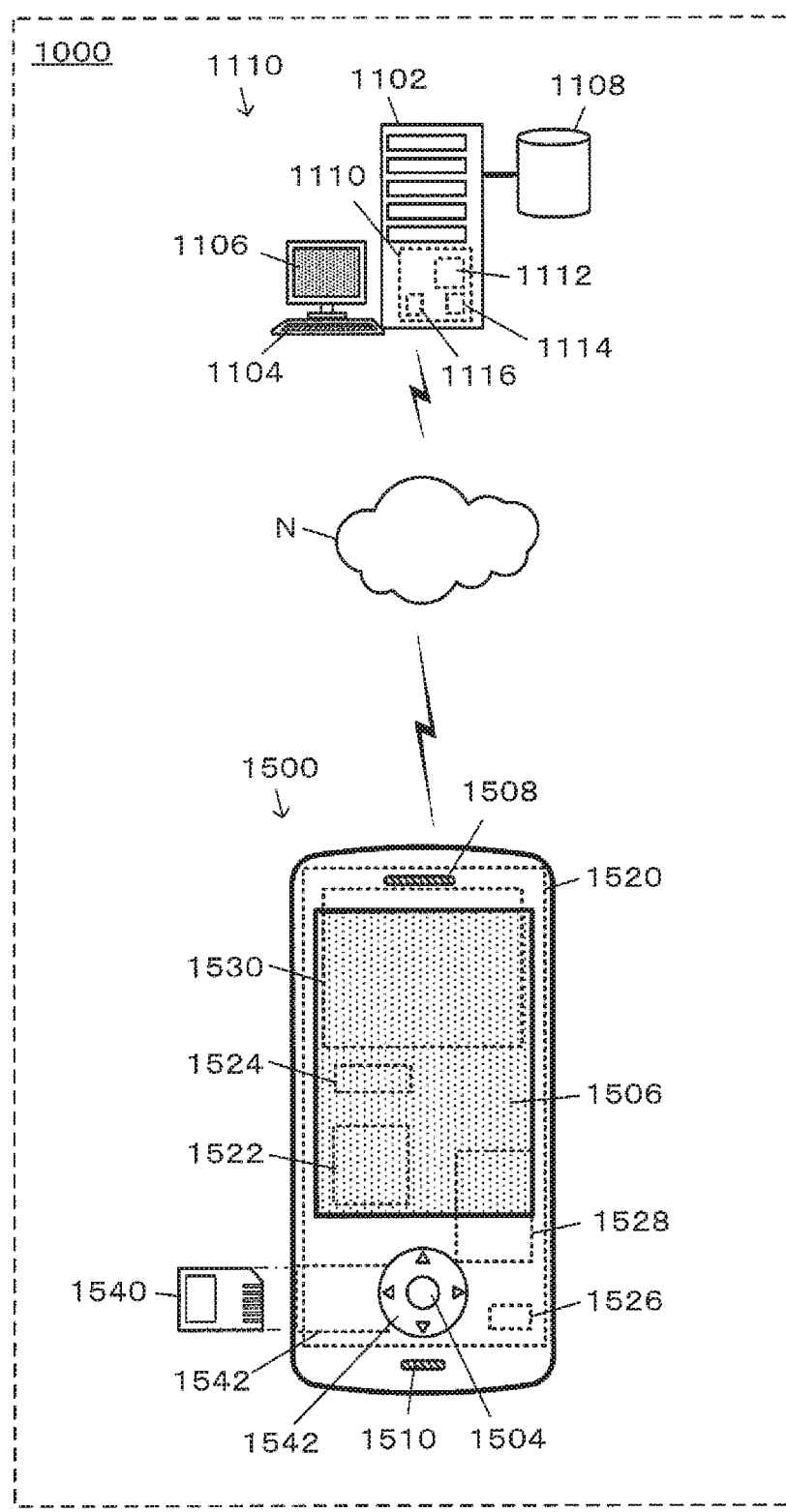
FIG. 1 is a diagram illustrating an example of a configuration of a game system.

The present embodiment can provide a new technique of incentivizing a user to watch a reward advertisement displayed in a game. Furthermore, the present embodiment can provide a new technique for making an advertisement more interesting to the user.

According to one embodiment of the invention, there is provided a computer system comprising: at least one processor or circuit programmed to execute as:

controlling implementation of a game;

managing advertisement watching information on each player;

acquiring information on a friend player of a target player;

selecting an advertisement option in the game to be played by the target player;

receiving selection by the target player on whether or not to watch the advertisement option;

determining a reward related to the game, based on whether or not the friend player has watched the advertisement option; and giving the reward to the target player when the advertisement option, selected to be watched by the target player, is controlled to be displayed.

The "computer system" as used herein may be a system including a single computer, and may be a system including a plurality of computers that are connected to each other to be capable of performing data communications with each other through a communication line.

According to this configuration, a reward can be given in exchange for watching an advertisement displayed in the game. The reward can be changed in accordance with whether the friend player has watched the advertisement. Thus, different rewards can be obtained by watching the same advertisement, in accordance with whether or not the friend player has watched the advertisement.

In the computer system, the determining the reward may include determining the reward based on number of the friend players who have watched the advertisement option.

In the computer system, the acquiring the information on the friend player may include acquiring an index value indicating intimacy between the target player and the friend player for each of the friend players, the determining the reward may include determining the reward based on whether or not a friend player with the index value satisfying a predetermined high intimacy condition has watched the advertisement option.

According to this configuration, the reward to be given can be changed in accordance with whether or not the friend player intimate with the target player has watched the advertisement. For example, a more valuable reward can be given for watching an advertisement that has been watched by a more intimate friend player, whereby watching the advertisement can be more interesting and a player can be incentivized to watch the advertisement.

In the computer system, the at least one processor or circuit may be further programmed to execute as notifying, when the advertisement option has been watched by the friend player, the target player that the friend player has watched the advertisement option.

According this configuration, the target player is notified that the advertisement option has been watched by the friend player, and thus can be more interested in the advertisement to be more likely to watch the advertisement. It can be expected that the target player talks about the advertisement with the friend player.

In the computer system, the advertisement watching information may include information on movie advertisement that has been entirely watched, the notifying may include notifying, when the advertisement option is a movie advertisement that has been entirely watched by the friend player, the target player that the advertisement option is a movie advertisement that has been entirely watched by the friend player.

According to this configuration, the target player is notified that the friend player has entirely watched an advertisement option that is a movie advertisement, so that the movie advertisement can be expected to be entirely watched by the target player.

In th computer system, the notifying may include notifying the target player of number of the friend players who have watched the advertisement option.

According to this configuration, the target player is notified of the number of the friend players who have watched the advertisement option, and thus can be more interested in the advertisement to be more likely to watch the advertisement.

In the computer system, the advertisement watching information may include game information indicating a game progress status and/or a player status at the time of watching an advertisement, the notifying may include notifying, when the game information of the friend player who has watched the advertisement option at the time of watching the advertisement and the game information on the target player at the time of watching the advertisement satisfy a predetermined correspondence condition, the target player that the friend player has watched the advertisement at the same time with the game information satisfying the predetermined correspondence information.

According to this configuration, for example, the target player is notified of satisfaction of a correspondence condition, satisfied when the current game progress status of the target player corresponds to the game progress status of the friend player at the point of watching the advertisement option. Thus, the target player can recognize that the friend player with the same or similar game progress status has watched the advertisement, to be more interested in the advertisement.

In the computer system, the advertisement watching information may include game information indicating a game progress status and/or a player status at the time of watching an advertisement, the determining the reward may include determining the reward, when the friend player has watched the advertisement option, based on whether or not the game information of the friend player who has watched the advertisement option at the time of watching the advertisement and the game information on the target player at the time of watching the advertisement satisfy a predetermined correspondence condition.

According to this configuration, for example, the reward changes based on whether or not the correspondence condition, satisfied when the current game progress status of the target player corresponds to the game progress status of the friend player at the point of watching the advertisement option, is satisfied. Thus, the target player with a game progress status similar to that of the friend player can be incentivized to watch the advertisement.

In the computer system, the selecting the advertisement option may include selecting an advertisement that has been watched by the friend player but has not been watched by the target player as the advertisement option, based on the advertisement watching information.

According to this configuration, an advertisement that has been watched by the friend player but has not been watched by the target player can be selected as the advertisement option. The target player, watching the same advertisement as that watched by the friend player, can be expected to talk about the advertisement with the friend player.

In the computer system, the acquiring the information on the friend player may include acquiring an index value indicating intimacy between the target player and the friend player for each of the friend players, the selecting the advertisement option may include selecting an advertisement that has been watched by the friend player with the index value satisfying a predetermined high intimacy condition but has not been watched by the target player, as the advertisement option, According to this configuration, the advertisement that has been watched by the friend player intimate with the target player is selected as the advertisement option, whereby the target player can be motivated to watch the advertisement watched by the friend player.

In the computer system, the advertisement watching information may include information on movie advertisement that has been entirely watched, the selecting the advertisement option may include selecting a movie advertisement that has been entirely watched by the friend player as the advertisement option.

According to this configuration, a movie advertisement that has been entirely watched by the friend player can be selected as the advertisement option. Thus, the movie advertisement that has been entirely watched by the friend player is selected as the advertisement option, and thus the target player can be incentivized to entirely watch the movie advertisement.

In the computer system, the at least one processor or circuit may be further programmed to execute as notifying the reward to be given when the advertisement option is watched.

According to this configuration, a notification indicating the reward to be given when the advertisement option is watched can be issued in advance, whereby the target player can be incentivized watch the advertisement.

According to another embodiment of the invention, there is provided a game system comprising: a server system that is the computer system according to claim 1; and a user terminal to which the player inputs an operation,
the server system and the user terminal being connected to the game system to be capable of performing a communication with each other.

According to this configuration, the game system that can achieve the effects described above can be implemented.

According to another embodiment of the invention, there is provided a computer system comprising: at least one processor or circuit programmed to execute as:

making a game progress based on an operation input by a player;

selecting an advertisement option displayed in the game;

determining whether or not a friend player of the player has watched the advertisement option by accessing a management system managing advertisement watching information on the friend player;

receiving selection by the player on whether or not to watch the advertisement option;

determining a reward related to the game based on a result of the determining; and giving the reward to the player when the advertisement option, selected to be watched by the player, is controlled to be displayed.

According to this configuration, a computer system according to another embodiment that can achieve the effects described above can be implemented.

According to another embodiment of the invention, there is provided a method, implemented on a computer system, the method comprising: on the computer system, making a game progress based on an operation input by a player;

selecting an advertisement option displayed in the game;

determining whether or not a friend player of the player has watched the advertisement option by accessing a management system managing advertisement watching information on the friend player;

receiving selection by the player on whether or not to watch the advertisement option;

determining a reward related to the game based on a result of the determining; and giving the reward to the player when the advertisement option, selected to be watched by the player, is controlled to be displayed.

According to this configuration, a method achieving the effects described above can be implemented.

An exemplary embodiment of the present invention is described below. It is a matter of course that modes to which the present invention can be applied are not limited to the embodiments described below.

First Embodiment

First of all, an example of display control for an advertisement that is watched in exchange for a reward given to a player in a game starting based on a gameplay start operation by the player is described as a first embodiment. The game may be of any genre, and may be a single player game or a multi-player game.

[Hardware Configuration]

First of all, an example of a hardware configuration according to the present embodiment is described. FIG. 1 is a diagram illustrating an example of a configuration of a game system 1000 according to the present embodiment. The game system 1000 according to the present embodiment is a system including a server system 1100 and a user terminal 1500 that can be connected to a communication line N to communicate with each other to exchange data. The example illustrated in FIG. 1 includes a single user terminal 1500. However, in an actual operation, a plurality of user terminals 1500 of different users who play the game (hereinafter, referred to as "players") ay each be connected to and communicate with the server system 1100. The game system 1000 as a whole may be referred to as a computer system, or the sever system 1100 and the user terminal 1500 may each be referred to as an individual computer system.

The communication line N is a communication channel that enables data communications. Specifically, the communication line N includes a communication network such as a local area network (LAN) using a private line (private cable) for direct connection, Ethernet®, and the like, a telecommunication network, a cable network, and the Internet. The communication method may be a cable communication method or a wireless communication method.

The server system 1100 includes a main body device 1102, a keyboard 1104, a display 1106, and a storage 1108.

A control board 1110 is provided in the main body device 1102. The control board 1110 includes a processor of various types (e.g., a central processing unit (CPU) 1112, a graphics processing unit (GPU), and a digital signal processor (DSP)), an IC memory 1114 of various types (e.g., a video random access memory (VRAM), a RAM, and a read only memory (ROM)), and a communication device 1116. The control board 1110 may partially or entirely be implemented with an application specific integrated circuit (ASIC), a field-programmable gate array (FPGA), and a System on a Chip (SoC).

Through a calculation process performed by the control board 1110 based on a predetermined program and data, the server system 1100 implements 1) a user management function related to user registration and the like 2) an online shopping function of selling various items, usable in the game, to the user online, and 3) a game management function of providing data required to play the game with the user terminal 1500, to manage play control on the game played with the user terminal 1500. Thus, the game according to the present embodiment is implemented as one type of client-server online games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line N to function as the server system 1100 as a whole.

The user terminal 1500 is a computer system, usable by a registered user serving as a player to play the game, and is an electronic device (electronic apparatus) that can access the server system 1100 via the communication line N to implement an online game. The user terminal 1500 according to the present embodiment is a device known as a smartphone. The user terminal 1500 may also be a portable game device, a game controller, a personal computer, a tablet computer, a wearable computer, an arcade game device, or the like.

The user terminal 1500 includes an arrow key 1502, a button switch 1504, a touch panel 1506 that functions as an image display device and a touch position input device, a speaker 1508, a microphone 1510, a control board 1520, a built-in battery 1530, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game, and a position measurement module such as a GPS module.

The control board 1520 includes a processor of various types (e.g., a CPU 1522, a GPU, and a DSP); an IC memory 1524 of various types (e.g., a VRAM, a RAM, and a ROM), a wireless communication module 1526 for performing wireless communications with a mobile phone base station, a wireless LAN base station, or the like connected to the communication line N, an interface circuit 1528; and the like.

The interface circuit 1528 includes circuits such as a circuit that receives signals from the arrow key 1502 and the button switch 1504, a driver circuit that drives the touch panel 1506, an output amplifier circuit that outputs a sound signal to the speaker 1508, an input signal generation circuit that generates a signal corresponding to the sound collected by the microphone 1510, and a signal input-output circuit that inputs and outputs a signal to and from the memory card reader 1542.

The elements mounted on the control board 1520 are electrically connected with each other via a bus circuit or the like to be capable of exchanging data and signals. The control board 1110 may partially or entirely be implemented with an ASIC, an FPGA, or a SoC. The control board 1520 stores a client program and various types of data, for implementing a function as a user terminal of the game according to the present embodiment, in the IC memory 1524.

The client program and various types of setting data are downloaded by the user terminal 1500 from the server system 1100 in the present embodiment. The program and the data may also be read from a storage medium such as the memory card 1540 additionally provided.

[Reward for Watching Advertisement]

Figure 2:
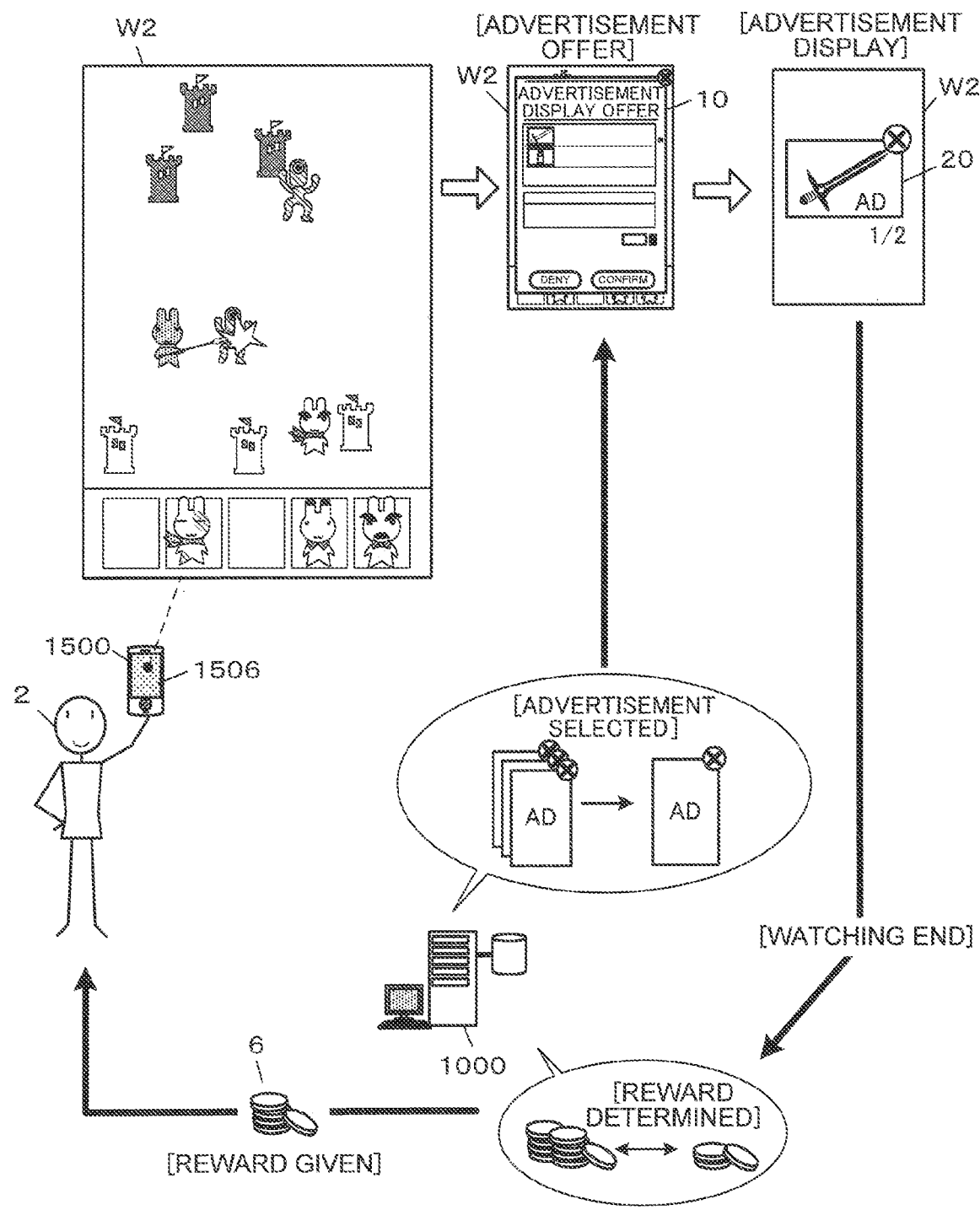
FIG. 2 is a diagram illustrating an overview of how a reward for watching an advertisement is set.

FIG. 2 is a diagram illustrating an overview of how a reward for watching an advertisement is set in the present embodiment. In the present embodiment, a player 2 performs a predetermined gameplay start operation on the user terminal 1500 to start playing a game. The game may be of any appropriate genre such as an action roll playing game (ARPG), a shooting game, or a puzzle game, for example. The touch panel 1506 of the user terminal 1500 displays a game screen W2 of the game being played, as well as a menu screen before the game is played (including menu items such as 1) online shopping, 2) party organization, 3) equipment change, 4) start game, 5) friend registration, and 6) chat, in an example of an ARPG), a result display screen after the gameplay, and the like. These statuses before the gameplay, during the gameplay, and after the gameplay are hereinafter collectively referred to as a gameplay status.

An offer display section 10, related to displaying of a reward advertisement, is displayed on the game screen W2 when the gameplay status is regarded as an "offer timing", for displaying an advertisement display offer, after the game has been started to be played.

The offer timing is a timing, before the gameplay, during the gameplay, or after the gameplay, such as a gameplay status where no urgent operation input is required from the player 2 and a gameplay status where no instruction operation input is acceptable. Specifically, the offer timing may be A) a timing at which a screen is switched, B) a timing at which the game progress satisfies a given change condition, and C) a timing in a status where no instruction operation for the gameplay by the player is acceptable.

More specifically, a settable offer timing before the gameplay includes 1) a timing immediately after the login, 2) an input wait timing during a period while a menu screen is being displayed after the login, 3) a timing of transition from the menu screen to a sub menu screen or execution of a menu item, 4) after purchasing in the online shopping, 5) before or after the party organization, 6) before or after equipment of a player character is changed, 7) before or after the friend registration, 8) before or after chatting, and 9) during data loading.

A settable offer timing during the gameplay includes 10) immediately after the game screen W2 is displayed, 11) while an operation menu is being called, 12) after player character level up notification, 13) after a battle, 14) after a stage is finished, 15) during data loading for transitioning to a new stage, 16) immediately after the transition to the new stage, and 17) immediately after a boss character appears.

A settable offer timing after the gameplay includes 18) after notification of a result of the gameplay that has just ended and 19) immediately before, during, and immediately after data save.

When the player 2 inputs a predetermined confirmation operation on the offer display section 10, an advertisement display 20 starts to be displayed. The player 2 can stop the advertisement display 20 that has started, at any timing. A reward 6 for watching the advertisement is given to the player 2 when the player stops the advertisement display 20 or when a predetermined period of time of displaying ends. In the present embodiment, this reward 6 is given.

The reward 6, which may be any reward appropriately set in accordance with the content of the game as long as the reward can be used in the game, include, for example,
1) item usable by a player character (any type of item),
2) ticket to a stage, a field, and a dungeon,
3) a free ticket for a lottery providing an item, character, or the like: randomly selected by the lottery (a free ticket for what is known as gacha),
4) increasing number of character equipment slots,
5) increasing party size,
6) online shopping coupon,
7) discount ticket for playing fee,
8) event participation ticket,
9) rematch ticket,
10) game currency,
11) exp,
12) skill,
13) player title,
14) color setting and decoration element for a player character or the like,
15) new player character,
or the like.

A first feature of the present embodiment is that an advertisement that has been watched by a friend of the player but has not been watched by a player is selected to be offered to the player to be watched. A friend is another user acknowledged and registered as a friend by the player.

Figure 3:
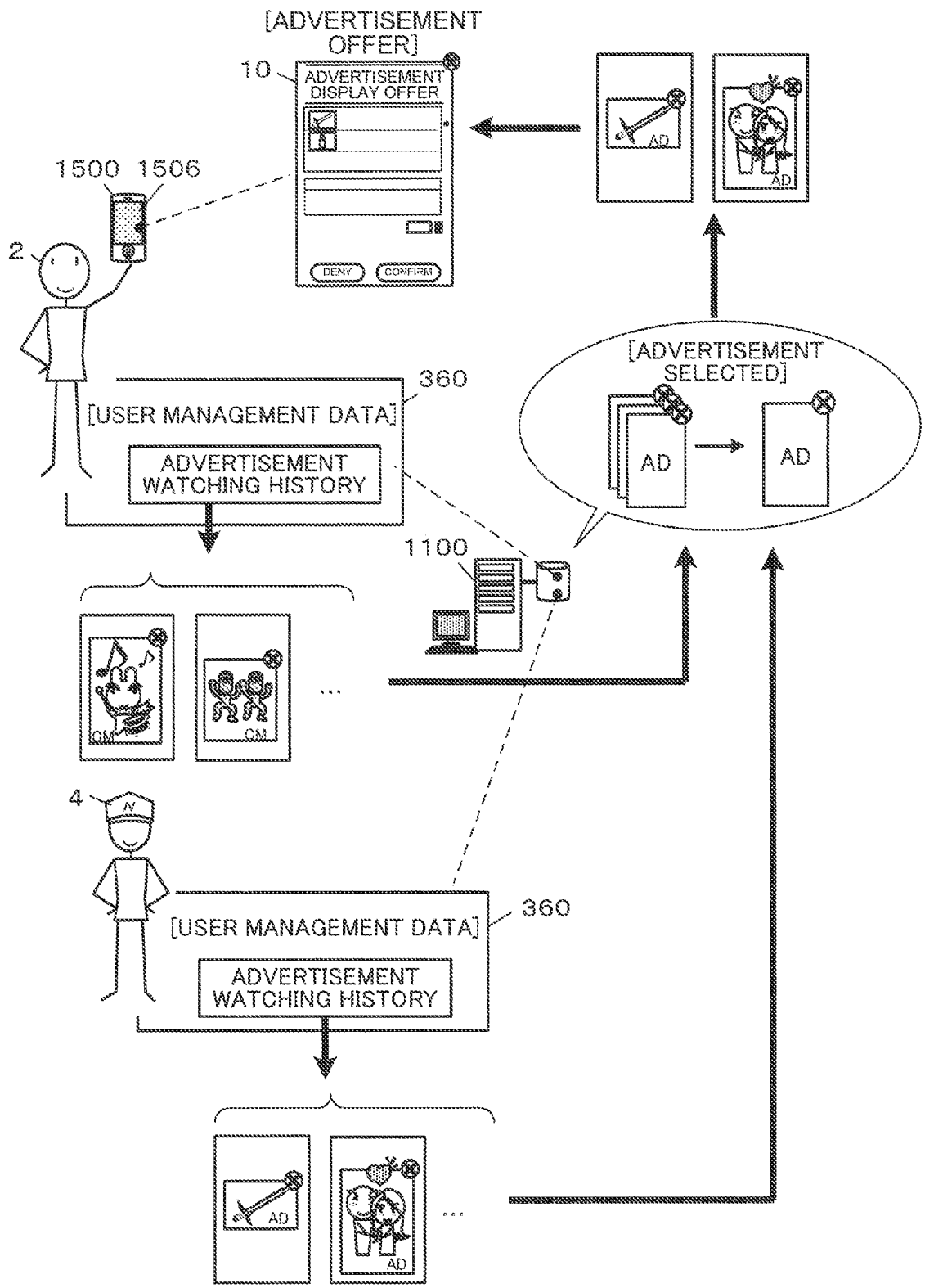
FIG. 3 is a diagram illustrating how an advertisement offered to be watched is selected.

FIG. 3 is a diagram illustrating how an advertisement to be offered is selected. A user management data 360, managed for each player 2 in the server system 1100, includes an advertisement watching history which is information on an advertisement that has been watched by the player 2 in the past. A predetermined number of (one or more) advertisements are randomly selected as advertisement options, offered to be watched to the player 2, from advertisements that have been watched by a friend 4 but have not been watched by the player 2 based on the advertisement watching history of the player 2 and the friend 4, to be displayed on the offer display section 10.

Figure 4:
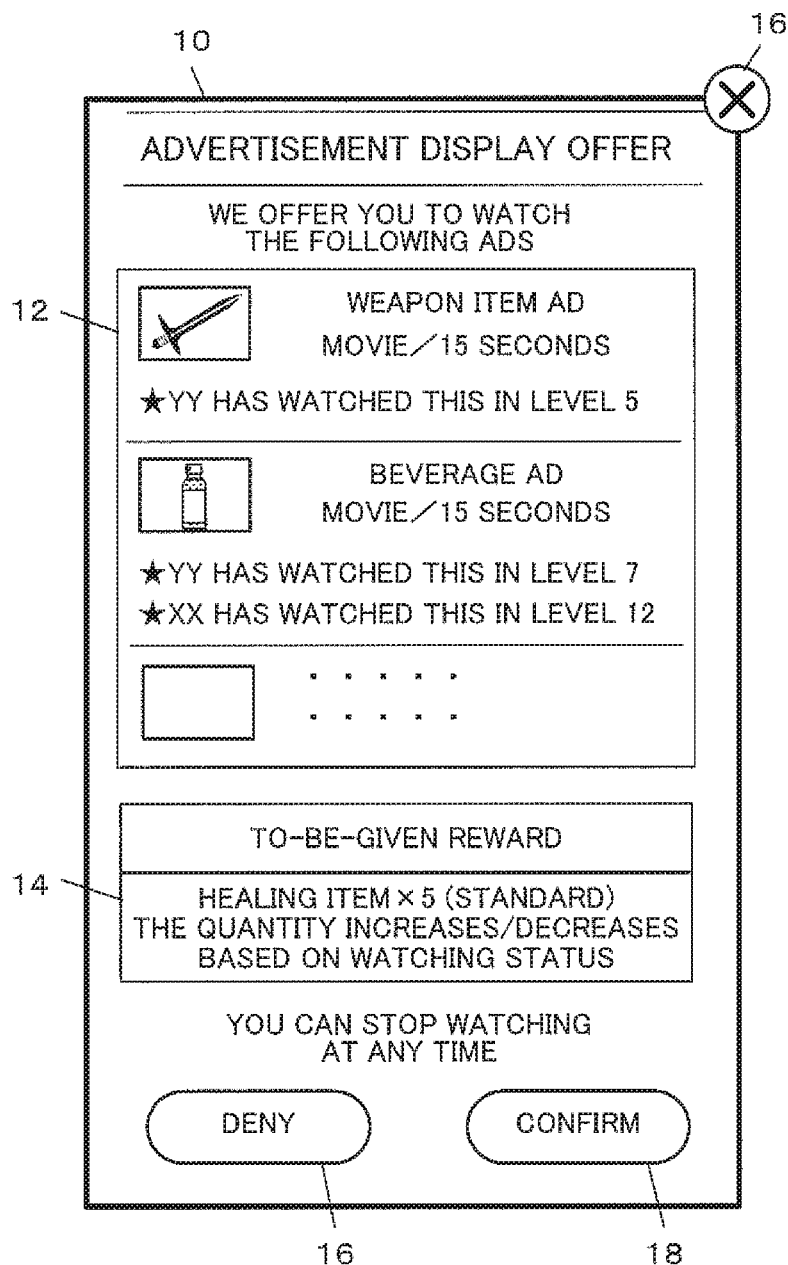
FIG. 4 is a diagram illustrating a display example of an offer display section.

FIG. 4 is a diagram illustrating a display example of the offer display section 10. The offer display section 10 is an input screen for obtaining confirmation for the advertisement display from the player 2, and notifies the player 2 of information on the advertisement to be displayed, as well as information on the reward to be given to the player 2 after watching the advertisement in advance. The offer display section 10 may be displayed through a popup display on the game screen W2 or by switching a certain display range on the screen (for example, a display section, other than a game display section, in a lower section of the display screen).

The offer display section 10 includes an advertisement option notification section 12, a to-be-given reward notification section 14, an advertisement display denying operation input icon 16, and an advertisement display confirmation operation icon 18.

Information on the offer related advertisement to be displayed and information on a friend that has already watched the advertisement are displayed on the advertisement option notification section 12. When a plurality of advertisements are displayed in series in a single watching time, the information on the plurality of advertisements is displayed, on the advertisement option notification section 12, as information on an advertisement option related to the offer. A thumbnail of the advertisement, a category of the advertisement, a product name, an advertisement type (e.g., movie/still image), a display time period, and the like may be appropriately set as the information on the advertisement as used herein. The information on the watched friend may be set to include a friend name, a game progress status (for example, the name of a stage being played or the like) and a player status (for example, a player level or the like) of the friend at the point of watching the advertisement, as appropriate.

Information on a reward to be given when the advertisement (offered advertisement option), notified using the advertisement option notification section 12, is entirely watched is displayed on the to-be-given reward notification section 14. This information includes the content of the reward and a message indicating that the reward can change. In an example of an item, the reward content preferably includes information related to the name of the item and a standard quantity given. The reward content clearly indicated in the to-be-given reward notification section 14 is referred to as "standard reward". In the present embodiment, the content of the reward to be actually given is obtained by changing the standard reward in accordance with a watching status of the player 2 or whether or not a friend of the player 2 has watched the advertisement. For example, in the example illustrated in FIG. 4, a message indicates that the number of items to be given as a reward changes in accordance with the watching status indicating whether or not the advertisement is entirely watched.

Figure 5:
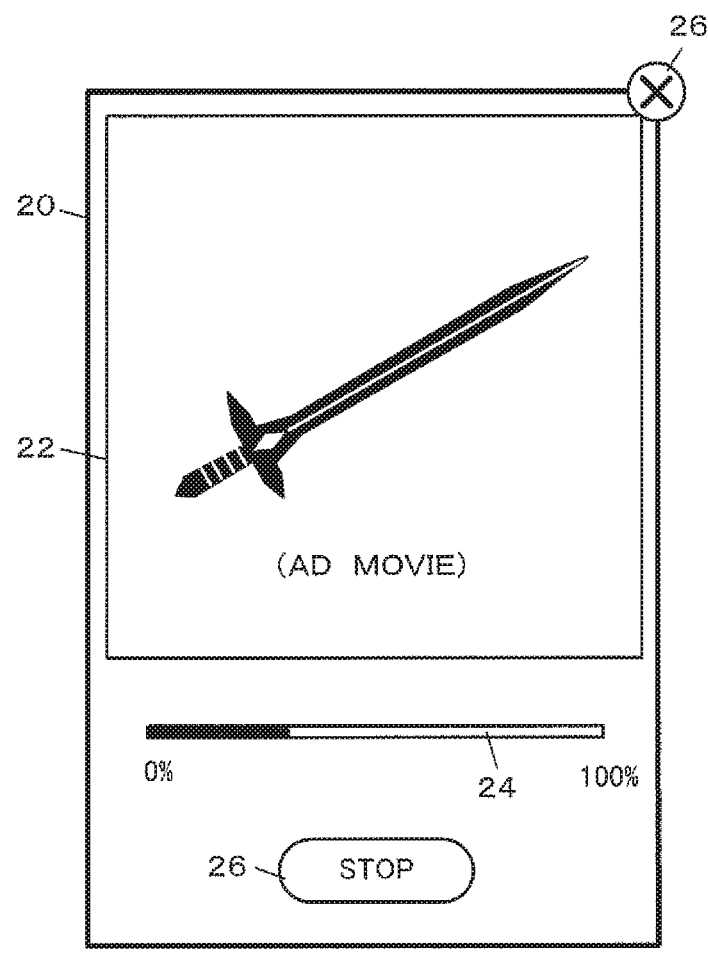
FIG. 5 is a diagram illustrating a display example of an advertisement display.

When the confirmation operation icon 16 is operated (selected), the offer display section 10 is deleted, and the advertisement display 20 for an advertisement option, displayed in the advertisement option display section 12, starts. When the denying operation icon 16 is operated (selected), the offer display section 10 is deleted, and the screen returns to the original game screen, FIG. 5 is a diagram illustrating a display example of the advertisement display 20. The advertisement display 20 includes an advertisement main section 22, a watched amount gauge 24, and a watching stop operation icon 26. The advertisement main section 22 is a still image or a movie of an advertisement. The watched amount gauge 24 indicates the ratio of a currently watched amount to the entire watched amount (time period) of the advertisement main section 22. When the watching stop operation icon 26 is operated, the advertisement display 20 is deleted from the game screen, and the advertisement watching stops. Then, a reward corresponding to the watching up to the point where the advertisement watching has been stopped is given to the player 2, and a reward giving notification 30 for notifying a reward given is displayed.

Figure 6:
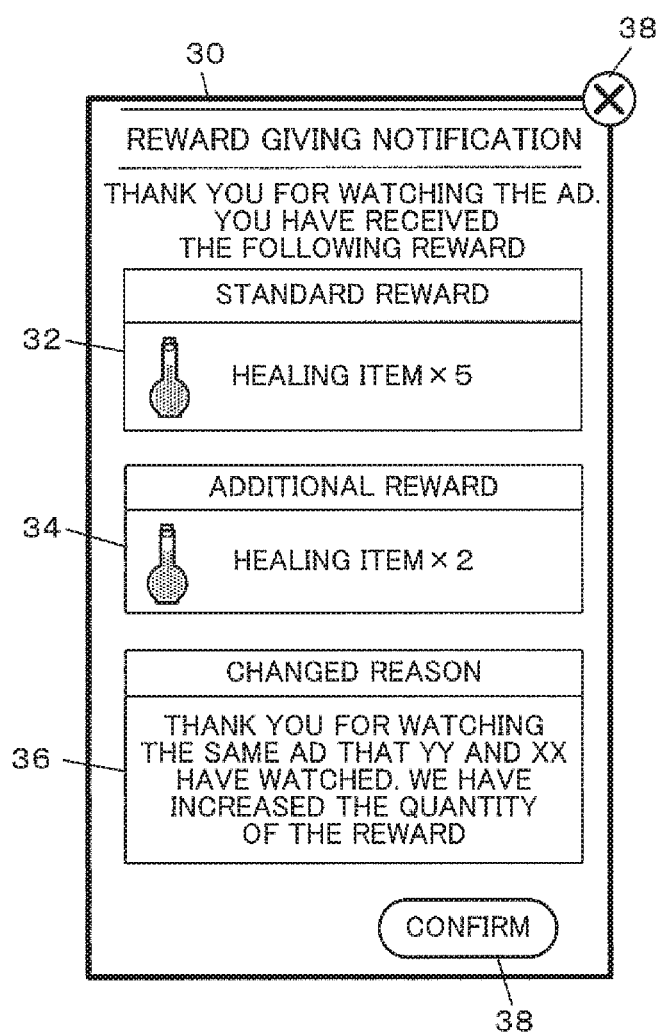
FIG. 6 is a diagram illustrating a display example of a reward giving notification.

FIG. 6 is a diagram illustrating a display example of the reward giving notification 30 notifying the player 2 that the reward has been given. The reward giving notification 30 includes a standard reward notification section 32, a changed reward notification section 34, a changed reason notification section 36, and a notification display cancel icon 38. The changed reward notification section 34 indicates that an item is added or deleted to or from the standard reward. The changed reason notification section 36 indicates the reason why the reward has changed. For example, advertisement watching that is 50% of the entire length of the advertisement results in the number of rewards reduced to 50% or less. The content of the reduction is displayed on the changed reward notification section 34, and a message indicating that the watched time has not reached the entire watching time is displayed on the changed reason notification section 36. As illustrated in FIG. 6, when there are friends who have watched the advertisement watched by the player 2, the number of rewards increases in accordance with the number of such friends. The content of the increase is displayed on the changed reward notification section 34, and the reason for the increase is displayed on the changed reason notification section 36.

A second feature of the present embodiment is that the content of the reward to be given in exchange for watching an advertisement changes in accordance with a status of a friend watching the advertisement.

Figure 7:
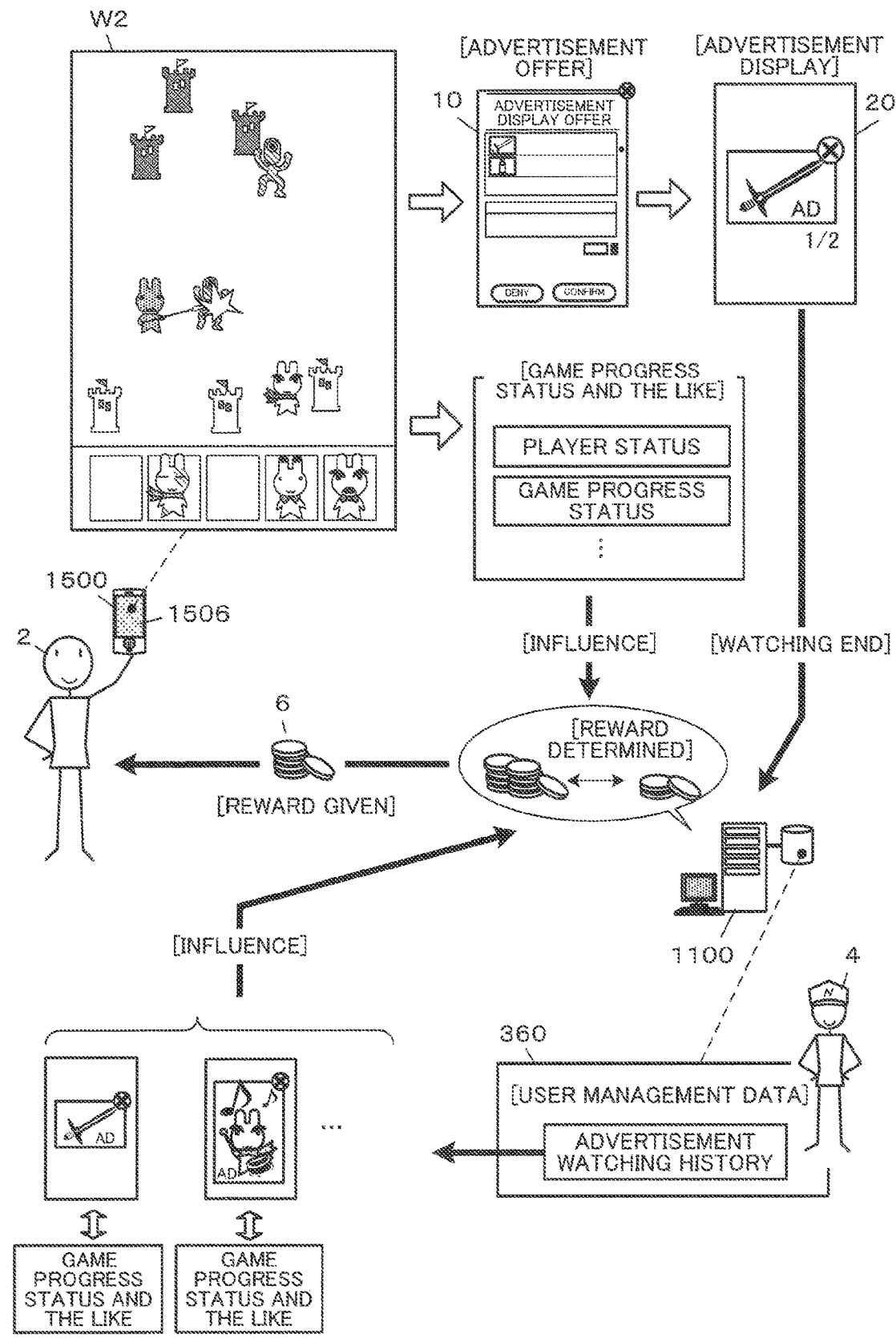
FIG. 7 is a diagram illustrating how a reward changes in accordance with whether or not a friend has watched the advertisement.

FIG. 7 is a diagram illustrating how a reward changes in accordance with a watching status of a friend. The advertisement watching history in the user management data 360, managed for each player in the server system 1100, includes watched advertisements each associated with a game progress status at the point of watching the advertisement (an offer timing in a strict sense), a game progress status including a player status, and the like. The content of the game progress status or the like can be set as appropriate in accordance with the content of the game. The game progress status may be a game progress (for example, a list of finished stages in an example of a stage-based game) indicating a progress of the game and play time indicating a period of time elapsed after the gameplay has started. The player status may be a player character level (or a player level or a play level) indicating the skill of the player.

The content of a reward given to the player 2 changes when the game progress status or the like of the player 2 at the point where an advertisement has been watched and the game progress status or the like of the friend 4, who has already watched the advertisement, at the point where the advertisement has been watched satisfy a corresponding condition set to be satisfied when the game progress statuses or the like are similar to each other.

[Functional Configuration]

Figure 8:
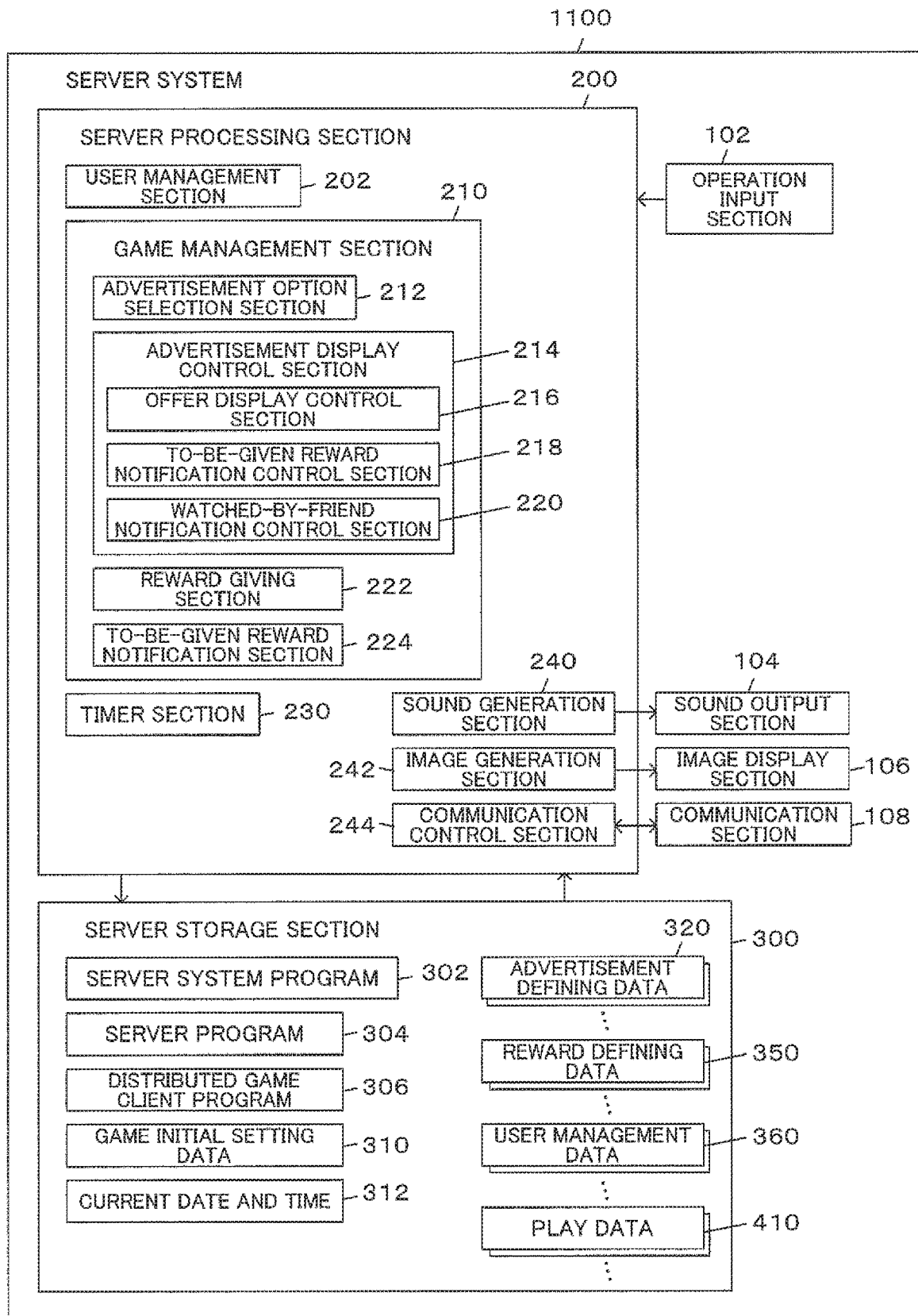
FIG. 8 is a diagram illustrating an example of a functional configuration of a server system.

FIG. 8 is a functional block diagram illustrating an example of the functional configuration of the server system 1100 according to the present embodiment. The server system 1100 includes an operation input section 102, a server processing section 200, a sound output section 104, an image display section 106, a communication section 108, and a server storage section 300.

The operation input section 102 is for inputting various operations for management. The keyboard 1104 in FIG. 1 corresponds to the operation input section 102.

The server processing section 200 is implemented by electronic parts such as a processor (e.g., a CPU and a GPU), an ASIC, and an IC memory. The server processing section 200 controls data exchanged between functional sections including the operation input section 102 and the server storage section 300, and performs a calculation process based on a predetermined program, data, the operation input signal from the operation input section 102, data revived from the user terminal 1500, and the like to entirely control the operation of the server system 1100. The server processing section 200 according to the present embodiment includes a user management section 202, a game management section 210, a timer section 230, a sound generation section 240, an image generation section 242, and a communication control section 244. Note that functional sections other than these may be included as appropriate.

The user management section 202 performs a process related to a user registration procedure and stores and manages the data associated with the account (user ID). In the present embodiment, the section has various functions including: 1) issuing an account to a registered user; 2) registration information management for registering and managing personal information for each account; 3) friend management related to registration and deletion of friends; 4) watched advertisement management related to advertisements that have been watched during gameplay; 5) book keeping management for a payment medium consumed for paying for a charged element related to the game (for example, the gameplay, charged lottery, online shopping, and the like); and 6) play history management for managing login/logout history. Note that any other appropriate management function for data associated with the account can be included.

The game management section 210 performs various processes related to gameplay management. The game according to the present embodiment is a client-server online game, and thus the game management section 210 communicates with the user terminal 1500 to perform control for providing data required for the gameplay. Specifically, the game management section 210 includes an advertisement option selection section 212, an advertisement display control section 214, a reward giving section 222, and a to-be-given reward notification section 224. Note that functional sections other than these may be included as appropriate.

The advertisement option selection section 212 acquires information on a friend player of a player (hereinafter, referred to as a "target player") playing a game, and selects an advertisement option to be displayed in the game played by the target player. In this process, an advertisement that has been watched by the friend player and has not been watched by the target player can be selected as the advertisement option, based on the advertisement watching information.

Specifically, the advertisement option is selected when a timing condition determined as a timing at which an advertisement is displayed is satisfied by a play status of the game. The timing satisfying the timing condition may be a timing including: a given screen switching timing (for example, a screen switching timing when a given game progress unit starts or ends); a timing at which the game progress satisfies a given change condition (for example, a timing at which the play level of the player changes); and a timing in a status where no instruction operation for the gameplay by the player is acceptable.

Figure 12:
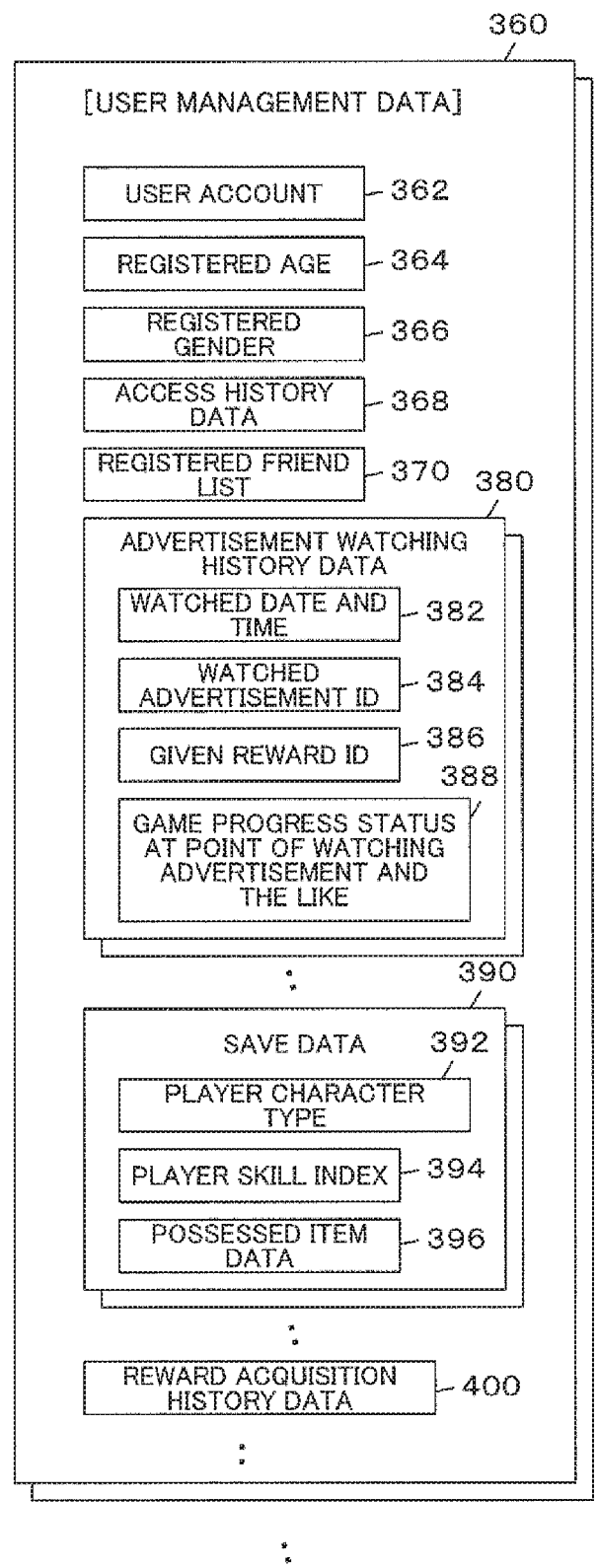
FIG. 12 is a diagram illustrating an example of a data structure of user management data.

The advertisement option can be selected as an advertisement that has been watched by the friend 4 and has not been watched by the player 2, based on advertisement watching history data 380 of the player 2 and the friend 4 (see FIG. 12). In this process, when there is no advertisement that has been watched by the friend 4 but has not been watched by the player 2, an advertisement that has not been watched by the player 2 may be selected regardless of whether or not the friend 4 has watched the advertisement.

The advertisement option selection section 212 may select the advertisement option to be an advertisement that has been watched by the friend player with an index value, indicating an intimacy between the target player and the friend player, high enough to satisfy a predetermined high intimacy condition, but has not been watched by the target player. Thus, the advertisement option may be selected only based on a friend with friendship level, serving as the index value indicating the intimacy to the target player, not lower than a predetermined value indicating high intimacy, in the friends of the target player.

The advertisement option selection section 212 may select the advertisement option to be a movie advertisement that has been entirely watched by the friend player. Specifically, a movie advertisement can be regarded as being "watched" when the movie has been entirely displayed.

The advertisement display control section 214 performs display control for an advertisement option in such a manner that the target player can select whether or not to watch (display) the advertisement option. Specifically, the advertisement display 20 with the advertisement option, selected by the advertisement option selection section 212, is displayed in the advertisement main section 22 (see FIG. 5). While the advertisement display 20 is being displayed, displaying of the advertisement can be stopped before the displaying is completed, based on a watching stop operation by the player.

The advertisement display control section 214 includes an offer display control section 216, a to-be-given reward notification control section 218, and a watched-by-friend notification control section 220.

The offer display control section 216 offers the player to watch the advertisement option selected by the advertisement option selection section 212. Specifically, control for displaying the offer display section 10 with the advertisement option is performed (see FIG. 4). The advertisement display control section 214 starts to implement the advertisement display 20 when the player performs a confirmation operation for the offer from the offer display control section 216, and does not implement the advertisement display 20 when the player performs a denial operation.

The to-be-given reward notification control section 218 performs control for issuing a notification indicating a reward to be given when an advertisement option is watched, when the offer display control section 216 offers the player to watch the advertisement option. In the present embodiment, this corresponds to display control for the reward giving notification section 14 in the offer display section 10 (see FIG. 4).

When the advertisement option has been watched by the friend player, the watched-by-friend notification control section 220 notifies the target player of information indicating that the advertisement option has been watched by the friend player. Specifically, this corresponds to display control for an advertisement option notification section 12 in the offer display section 10 (see FIG. 4).

When the advertisement option is a movie advertisement and the friend player has entirely watched the movie advertisement, the watched-by-friend notification control section 220 can notify the target player of the situation. A notification indicating the number of the friend players who have watched the advertisement option can be issued. When a predetermined correspondence condition is satisfied with the game progress status or the like at the point when the friend player who has watched the advertisement option has watched the advertisement and the game progress status or the like at the point when the target player has watched the advertisement, the target player can be notified that the friend player with the game progress status satisfying the correspondence condition has watched the advertisement.

The reward giving section 222 gives a given reward related to the game to the target player when the advertisement option is controlled to be displayed with the target player selecting to watch the advertisement, and changes the reward based on whether the advertisement option has been watched by the friend player and gives the resultant reward to the target player.

Specifically, a reward associated with an advertisement controlled to be displayed by the advertisement display control section 214 is set as a standard reward. The standard reward is changed in accordance with whether or not the advertisement has been watched by a friend of the target player so that a reward to be actually given is determined, and the reward thus determined is given to the player 2.

The reward giving section 222 may change the reward based on the number of the friend players who have watched the advertisement option, and give the resultant reward to the target player. The reward may be changed based on whether or not the friend player, with an index value satisfying a predetermined high intimacy condition, has watched the advertisement, to be given to the target player. The reward can be changed in accordance with whether or not the predetermined correspondence condition is satisfied with the game progress status or the like at the point when the friend player has watched the advertisement and the game progress status or the like at the point when the target player has watched the advertisement, when the advertisement option has been watched by the friend player. Then, the resultant reward may be given to the target player.

The reward giving notification section 224 performs control for notifying a reward given to the target player by the reward giving section 222. Specifically, control for displaying the reward given notification 30 is performed (see FIG. 6).

The timer section 230 uses a system clock to obtain the current date and time, a time limit, and the like.

The sound generation section 240 is implemented by an integrated circuit (IC) or by executing software that generates sound data and performs decoding, and generates or decodes sound data on a sound related to system management for the server system 1100 or related to the gameplay, background music (BGM), and a character voice. The resultant sound signal related to the system management is output to the sound output section 104. The sound output section 104 receives the sound signal to emit the corresponding sound. A speaker (not illustrated) of the main body device 1102 or the display 1106 in the example illustrated in FIG. 1 corresponds to the sound output section 104.

The image generation section 242 can generate an image related to the system management for the server system 1100, a game image (or data for displaying the game image on the user terminal 1500), and the like. The image related to the system management can be output to the image display section 106. The image display section 106 displays various images for system management based on the image signals input from the image generation section 242. The image display section 106 may be implemented with an image display device such as a flat panel display, a cathode ray tube (CRT), a projector, or a head-mounted display. In the example illustrated in FIG. 1, the display 1106 corresponds to the image display section 106.

The communication control section 244 performs a data process related to data communications, and exchanges data with an external device through the communication section 108. In the present embodiment, a process related to the data communications with the user terminal 1500 is performed. The communication section 108 connects to the communication line N to implement communications. The communication section 108 is implemented with a transceiver, a modem, a terminal adapter (TA), a jack for a communication cable, a control circuit, and the like. In the example illustrated in FIG. 1, the communication device 1116 corresponds to the communication section 108.

The server storage section 300 stores a program and various types of data for implementing various functions of the server processing section 200 for entirely controlling the server system 1100. The server storage section 300 is used as a work area for the server processing section 200, and temporarily stores the results of calculations performed by the server processing section 200 based on various programs. The function of the server storage section 300 is implemented with an IC memory (e.g., RAM and ROM), a magnetic disk (e.g., hard disk), an optical disk (e.g., CD-ROM and DVD), an online storage, or the like. In the example illustrated in FIG. 1, a storage medium such as the IC memory 1114 and hard disk mounted in the main body device 1102 and the storage 1108 correspond to the server storage section 300.

The server storage section 300 according to the present embodiment stores therein in advance, a server system program 302, a server program 304, a distributed game client program 306, game initial setting program 310, advertisement defining data 320, and reward defining data 350. The server storage section 300 stores data, sequentially generated and managed, including user management data 360, play data 410, and current date and time 312. Furthermore, information on a timer, a counter, various flags, and the like may be stored as appropriate.

The server system program 302 is read out and executed by the server processing section 200 for causing the server system 1100 to implement a basic input/output function required for a computer. The server program 304 is read out and executed by the sever processing section 200 for implementing functions of the user management section 202 and the game management section 210. The distributed game client program 306 is an original of a game client program provided to the user terminal 1500. The game initial setting program 310 includes various types of initial setting data, defining data, and the like for executing the game according to the present embodiment.

Figure 9:
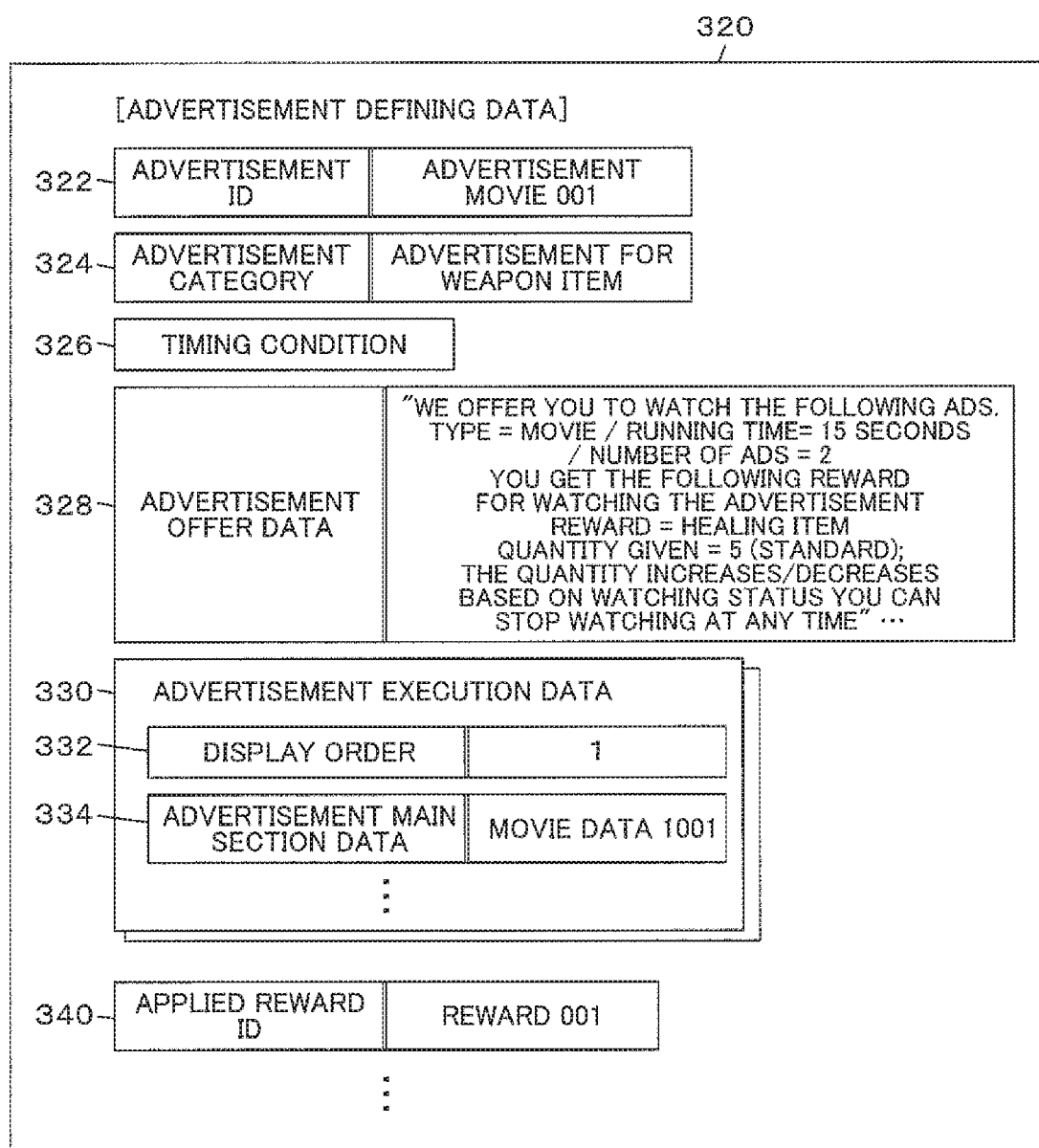
FIG. 9 is a diagram illustrating an example of a data structure of advertisement defining data.

The advertisement defining data 320 is stored for each type of an advertisement prepared, and defines the advertisement displayed in the game. As illustrated in FIG. 9, each advertisement defining data 320 is data including: a unique advertisement ID 322; an advertisement category 324; a timing condition 326 for defining a timing at which the advertisement is displayed; advertisement offer data 328 defining what is displayed on the offer display section 10; advertisement execution data 330 for implementing advertisement display; and an applied reward ID 340. The advertisement category 324 is categories of advertisements classified based on the content of the advertisement (which can also be regarded as a target of the advertisement), and includes food, clothing, furniture, household appliances, a game, an item or a character in a game, and the like, for example. Note that other types of data can be included as appropriate.

The timing condition 326 is a timing condition defined as a timing at which the advertisement is displayed and defines a timing at which the offer display section 10 is displayed. In other words, a timing of displaying the advertisement and characteristics of a player who is a potential target of the advertisement are defined. The condition is set as appropriate in accordance with the sponsor of the advertisement.

The advertisement offer data 328 includes various types of data for displaying the offer display section 10 (see FIG. 4). For example, the data includes text data and image data such as an icon.

In the present embodiment, the advertisement execution data 330 is data for implementing the advertisement display 20 (see FIG. 5) and includes one or a plurality of pieces of advertisement execution data 330 that start in response to a confirmation operation on the offer display section 10. One advertisement execution data 330 includes a display order 332 and advertisement main section data 334 associated with each other. The advertisement main section data 334 is data for implementing the advertisement main section 22 (see FIG. 5) of the advertisement display. The content of data such as text data, still image data, movie data, script data, 3DCG modeling data, and texture data can be set as appropriate depending on how the advertisement main section 22 is implemented. The applied reward ID 340 is data indicating which reward is applied to an advertisement to be watched based on the advertisement defining data. The applied reward ID 340 includes a reward ID of the reward defining data 350 defining the corresponding reward.

Figure 10:
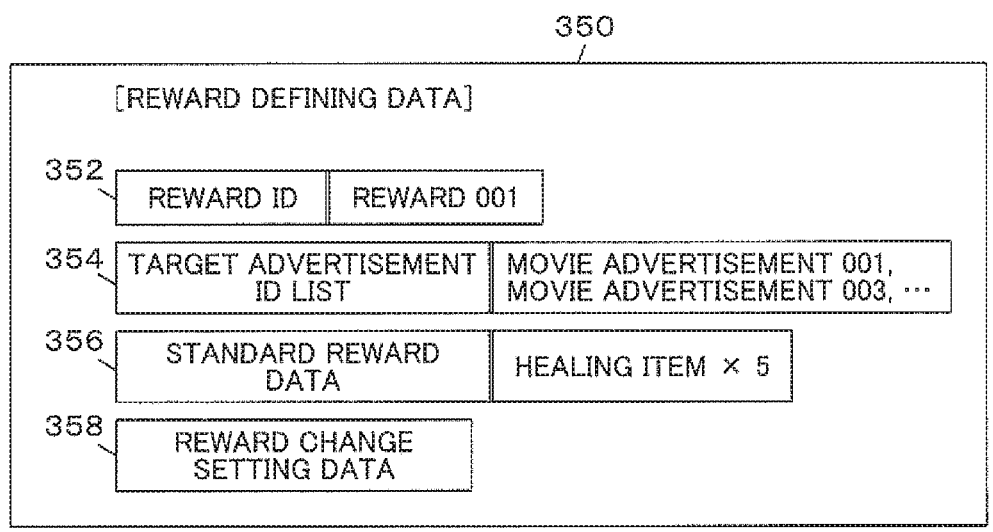
FIG. 10 is a diagram illustrating an example of a data structure of reward defining data.

The reward defining data 350 is stored for each type of a reward for watching an advertisement prepared, and defines a content of the reward for watching an advertisement. For example, as illustrated in FIG. 10, one reward defining data 350 includes a unique reward ID 352, a target advertisement ID list 354, standard reward data 356, and reward change setting data 358. Note that other types of data can be included as appropriate.

The target advertisement ID list 354 is a list of the advertisement IDs 322 (see FIG. 9) to which the defining data is applied.

The standard reward data 356 defines a standard content of the reward. The content can be set as appropriate in accordance with the content of the game. In the present embodiment, the content of the reward to be actually given is changed from the standard content.

For example, the reward to be given may be an item (for example, equipment of a player character, a lottery ticket for what is known as gacha, a ticket to a new dungeon or map, a game currency, a title, a player character color setting, sound data on words of a player character read by a voice actor, and the like). In such a case, the standard reward data 356 includes one or a plurality of sets of a given item ID indicating the type of an item to be given and the number of the given items.

The reward may be increase/decrease of an ability parameter value of the player character (for example a skill, energy, hit point, attack power, defense power, mobility, popularity, favorability, and the other like parameters that can be set as appropriate in accordance with the content of the game). In such a case, the standard reward data 356 may include one or a plurality of sets of the type of target ability parameter value and an increased/decreased amount.

The reward may be implemented as a coupon given. In such a case, one or a plurality of sets of the type and the quantity of the coupon to be given may be included.

The reward may be implemented as rental of a rental character usable as a player character. In such a case, the standard reward data 356 may include one or a plurality of sets of settings on the type and an ability parameter value of the rental character and a condition on a rental period and returning.

The reward change setting data 358 is data defining how the content defined by the standard reward data 356 is changed and a condition of the change. The reward change setting data 358 includes a change executing condition 358a, a changed content 358b, and reward giving notification setting data 358c, in association with each other, as illustrated in FIG. 11 for example. Note that other types of data can be included as appropriate.

The change executing condition 358a defines a condition for changing the content defined by the standard reward data. In the present embodiment, this corresponds to a condition related to the friend who has watched the corresponding advertisement. Specifically, the number of friends who have watched the corresponding advertisement, the friendship level regarding the friend who has watched the corresponding advertisement, whether or not the correspondence condition is satisfied with the game progress status or the like at the point when the friend player who has watched the corresponding advertisement option has watched the advertisement and the game progress status or the like of the target player (for example, whether or not a condition is satisfied with a difference between the levels of the player at the point of watching the advertisement, a difference in stages played at the point of watching the advertisement, or the like being within a range of similarity), and the like may be set.

The changed content 358b defines how the content defined by the standard reward data 356 is changed. For example, when the standard reward data 356 is set to be giving an item, increase/decrease of the giving quantity can be set. Furthermore, a reward to be added, different from the item defined by the standard reward data 356, can be set. In the example illustrated in FIG. 11, an example where the increased number of the given item and an additional item ID is set is illustrated. The changed content 358b may be set to be increase/decrease of the ability parameter value of a player character, giving coupon, rental of a rental character usable as the player character, and the like, as in the case of setting the reward in the standard reward data 356.

The reward giving notification setting data 358c defines a content of the notification issued by the reward giving notification 30 (see FIG. 6). For example, the reward giving notification setting data 358c includes information such as an image and a text displayed with the standard reward notification section 32 and the changed reward notification section 34 and a text displayed with the changed reason notification section 36.

The user management data 360 is prepared for each registered user, that is, for each player, and includes various types of data associated with the user account. For example, as illustrated in FIG. 12, one user management data 360 includes a unique user account 362, a registered age 364, a registered gender 366, access history data 368, a registered friend list 370, advertisement watching history data 380, save data 390, and reward acquisition history data 400. Note that other types of data can be included as appropriate.

The access history data 368 is data in which the past game played timings are stored in series, and is automatically updated at a login/logout timing.

The registered friend list 370 is a list of user accounts of other users acknowledged as friends by the player. The user account of each friend is stored while being associated with the friendship level serving as an index value indicating the intimacy to the target player, registered date and time, and the like. The friendship level changes in accordance with time elapsed after the player has been registered as a friend, the number of times and a period of time the player has joined the party in the game, the number of times and a period of time the player has chatted with the target player, and the like. New friend registration, deregistration, and the like for such a friend can be performed through a predetermined registration procedure.

The advertisement watching history data 380 is generated each time the confirmation operation is performed for watching the advertisement, and includes data on advertisement watching. For example, one advertisement watching history data 380 includes watched date and time 382, an advertisement ID 384 of a watched advertisement, a reward ID 386 of a reward given in exchange for watching an advertisement, a game progress status 388 at the point of watching the advertisement, and the like, in association with each other.

The save data 390 includes various types of data indicating the game progress status at the previous gameplay. For example, the data includes a player character type 392, a player skill index 394, and possessed item data 396. Note that other types of data can be included as appropriate. The possessed item data 396 is prepared for each type of an item usable in the game, and includes information indicating the possessed quantity of the item and the expiration date of the item, or the like. The data is automatically generated each time the item is purchased in the online shopping, and the possessed quantity is automatically updated each time the item is used during the gameplay. The data is automatically generated and updated also when the item is acquired as a clear bonus, a drop item, or the like during the gameplay.

The reward acquisition history data 400 is generated each time a reward for watching the advertisement is acquired. For example, one reward acquisition history data 400 includes acquisition date and time, a watched advertisement ID indicating the advertisement with which the reward is acquired, the reward ID, the standard reward, and a changed content in association with each other. Note that other types of data can be included as appropriate.

Figure 13:
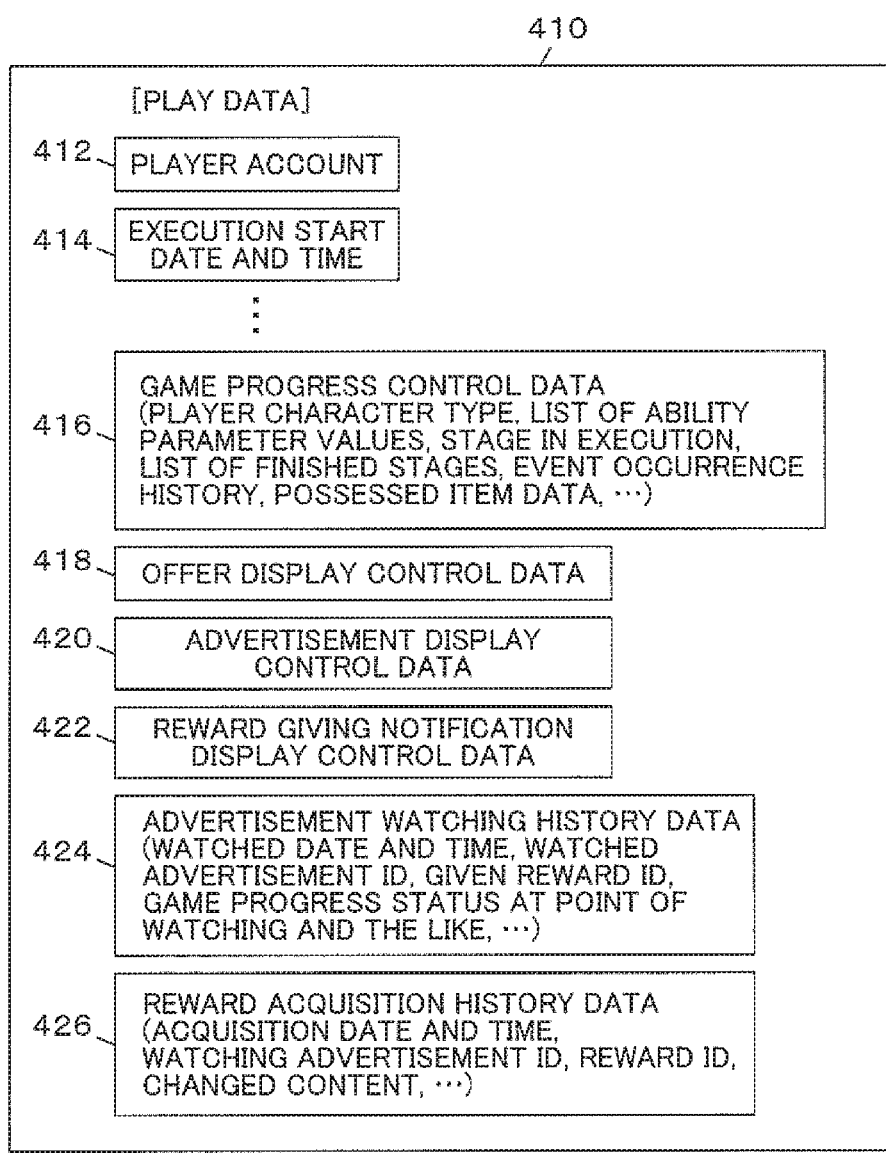
FIG. 13 is a diagram illustrating an example of a data structure of play data.

The play data 410 is prepared for each player (in other words for each user terminal 1500), and includes various types of data indicating the gameplay status. Specifically, one piece of play data 410 includes, as illustrated in FIG. 13 for example, a player account 412 including a user account of a player, execution start date and time 414, game progress control data 416, offer display control data 418, advertisement display control data 420, reward giving notification display control data 422, advertisement watching history data 424, and reward acquisition history data 426. Note that other types of data can be included as appropriate.

The player account 412 indicates a corresponding player. The game progress control data 416 is generated when the gameplay starts, and includes various types of data indicating a progress status during die gameplay. The detail of the data can be set as appropriate in accordance with the content of the game. For example, the data may be data including; a player character type; information on the current position in the game space; a list of ability parameter values of the character; an executed game progress unit indicating a game progress unit during the gameplay (for example, a stage, a scenario, a map, a time in the game world, or the like); a finished progress unit list indicating the finished units of the game progress units; an event occurrence history; and possessed item data. Note that other types of data can be included as appropriate. For example, a deck configuration list, the name of a song in a played game, a game difficulty setting, and the like may be included as appropriate in accordance with the detail of the game.

The offer display control data 418 includes various types of control data related to displaying on the offer display section 10 (see FIG. 4). The advertisement display control data 420 includes various types of control data related to displaying on the advertisement display 20 (see FIG. 5). For example, the data includes a displayed advertisement ID, reference coordinates for determining the displayed position, the display size, a currently effective display order, the watched amount, the detail of the obtained reward, and the like. Note that other types of data can be included as appropriate.

The reward giving notification display control data 422 includes various types of control data related to displaying on the reward giving notification 30 (see FIG. 6). Data with the same name as the advertisement watching history data 424 and the reward acquisition history data 426 is copied from the user management data 360 on a player before the gameplay and, updated during the gameplay. The resultant data is reflected on the user management data 360 after the gameplay.

[User Terminal]

Figure 14:
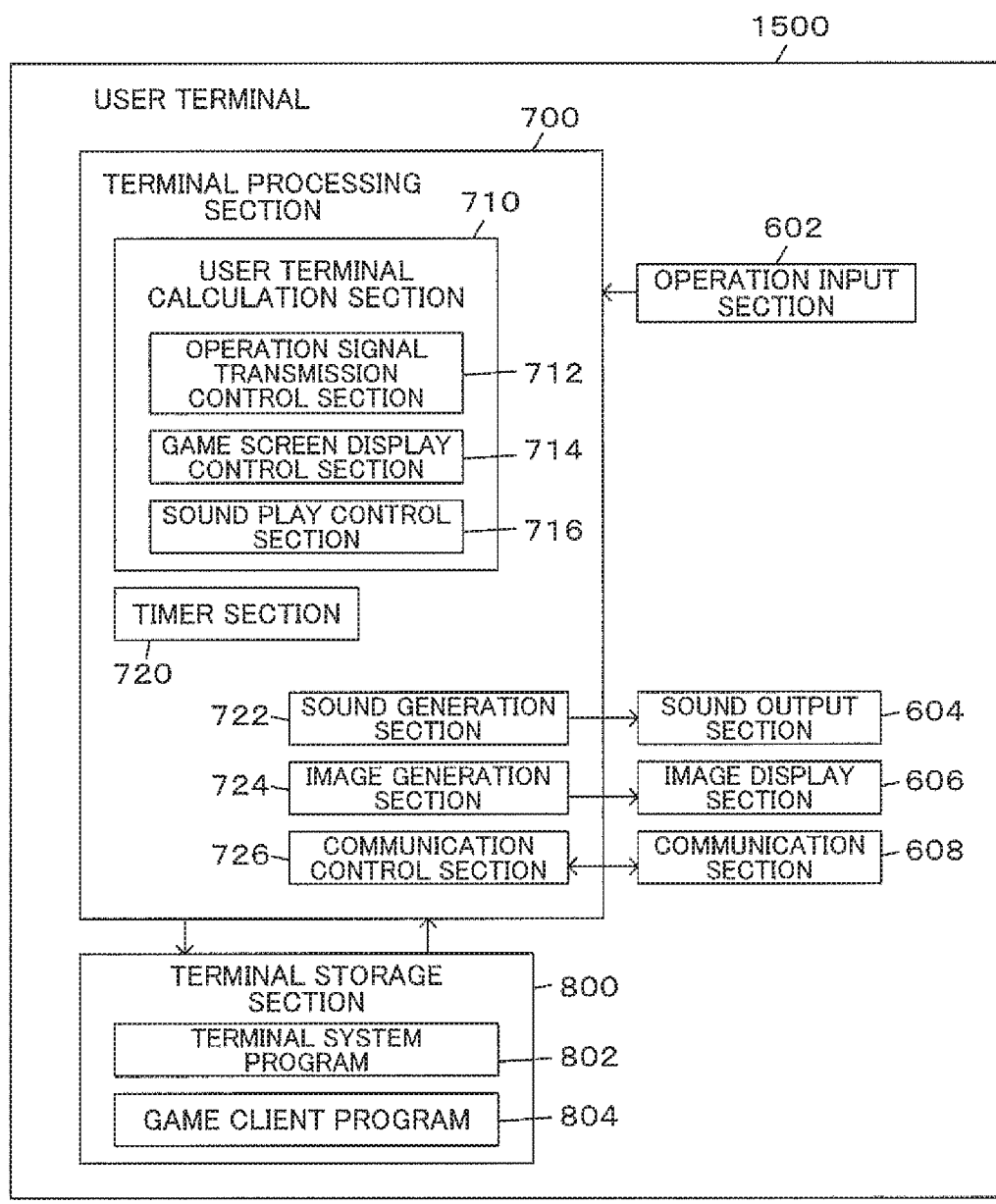
FIG. 14 is a diagram illustrating an example of a functional configuration of a user terminal.

FIG. 14 is a functional block diagram illustrating an example of a functional configuration of the user terminal 1500 according to the present embodiment. The user terminal 1500 includes an operation input section 602, a terminal processing section 700, a sound output section 604, an image display section 606, a communication section 608, and a terminal storage section 800.

The operation input section 602 outputs an operation input signal, based on various operation inputs by the player, to the terminal processing section 700, and can be implemented with a push switch, a joystick, a touch pad, a track ball, an accelerometer, a gyro, a CCD module, or the like. The arrow key 1502, the button switch 1504, and the touch panel 1506 in FIG. 1 correspond to the operation input section 602.

The terminal processing section 700 is implemented by electronic parts such as a processor (e.g., CPU and GPU), an ASIC, and an IC memory. The terminal processing section 700 performs input/output control to exchange data with each of the functional sections including the operation input section 602 and the terminal storage section 800. The terminal processing section 700 executes various calculation processes based on a predetermined program or data, the operation input signal from the operation input section 602, and various types of data received from the sever system 1100 to control the operation of the user terminal 1500. The control board 1520 in FIG. 1 corresponds to the terminal processing section 700. The terminal processing section 700 according to the present embodiment includes a user terminal calculation section 710, a timer section 720, a sound generation section 722, an image generation section 724, and a communication control section 726.

The user terminal calculation section 710 includes an operation signal transmission control section 712, a game screen display control section 714, and a sound play control section 716.

The operation signal transmission control section 712 performs a process of transmitting various types of data and a request to the sever system 1100 in accordance with an operation on the operation input section 602.

The game screen display control section 714 performs control for displaying a game screen based on various types of data received from the server system 1100. In this configuration, the server system 1100 generates the image of the game screen. Alternatively, a configuration where the user terminal 1500 generates the image may also be employed. In this configuration, the game screen display control section 714 may be in charge of controlling an object disposed in a virtual three-dimensional space for generating a 3DCG for example.

The sound play control section 716 performs control to emit a sound (for example, sound effects, a BGM, words read by a voice actor, and the like) based on various types of sound data received from the server system 1100.

For example, the sound generation section 722 is implemented with a processor such as a DSP or a sound synthesizing IC, an audio codec for playing a sound file, or the like, and generates a sound signal for sound effects, a BGM, various types of operation sound, words read by a voice actor, and the like related to the game, and outputs the signal thus generated to the sound output section 604. The sound output section 604 is implemented with a device that outputs sound such as sound effects, a BGM, or the like, based on the sound signal received from the sound generation section 722. The speaker 1508 in FIG. 1 corresponds to the sound output section 604.

For example, the image generation section 724 is implemented with a processor (e.g., a GPU or a DSP), a video signal IC, a program (e.g., video codec), a drawing frame IC memory (e.g., frame buffer), and the like. The image generation section 724 generates an image of one game screen every frame (e.g., 1/60 of a second) based on the various types of data received from the server system 1100, and outputs the generated image signal of the game screen to the image display section 606. The image display section 606 displays various game images based on the image signals input from the image generation section 724. The image display section 606 may be implemented with an image display device such as a flat panel display, a cathode ray tube (CRT), a projector, or a head-mounted display. In the present embodiment, the touch panel 1506 in FIG. 1 corresponds to the image display section 606.

The communication control section 726 performs a data process related to the data communication, and exchanges data with an external device through the communication section 608. The communication section 608 connects to the communication line N to implement communications. For example, the communication section 608 is implemented with a transceiver, a modem, a TA, a jack for a communication cable, a control circuit, and the like. The wireless communication module 1526 in FIG. 1 corresponds to the communication section 608.

The terminal storage section 800 stores therein a system program for implementing various functions for causing the terminal processing section 700 to entirely control the user terminal 1500, a program and various types of data required for the gameplay, and the like. The terminal storage section 800 is used as a work area for the terminal processing section 700, and temporarily stores a result of calculation performed by the terminal processing section 700 in accordance with various programs, input data received from the operation input section 602, and the like. These functions are implemented with an IC memory (e.g., RAM and ROM), a magnetic disk (e.g., hard disk), an optical disk (e.g., CD-ROM and DVD), or the like. The IC memory 1524 and the memory card 1540 in the control board 1520 illustrated in FIG. 1 correspond to the terminal storage section 800. The terminal storage section 800 according to the present embodiment stores therein a terminal system program 802 and a game client program 804. Note that other data can be included as appropriate.

The terminal system program 802 is a program for causing the user terminal 1500 to implement a basic input/output function of a computer.

The game client program 804 is application software that implements a function of the user terminal calculation section 710 when read and executed by the terminal processing section 700, and may be embedded as a part of the terminal system program 802. In the present embodiment, the game client program 804 is a copy of the distributed game client program 306 (see FIG. 8) provided from the sever system 1100. The game client program 804 may be implemented with a dedicated client program or with a web browser program and a plugin that implements an interactive image display, depending on a technique and a method for implementing an online game.

[Flow of Process]

A flow of a process in the server system 1100 is described. The flow of the process described herein is implemented with the server processing section 200 executing the server program 304.

Figure 15:
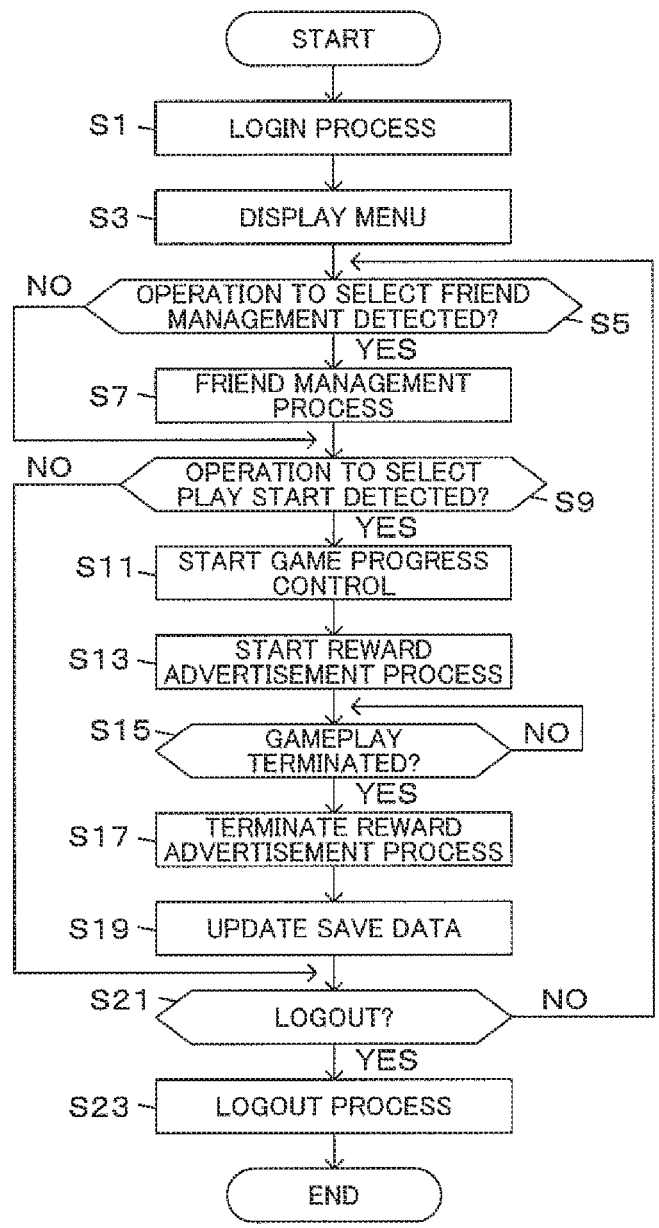
FIG. 15 is a flowchart illustrating a process in the server system.
Figure 16:
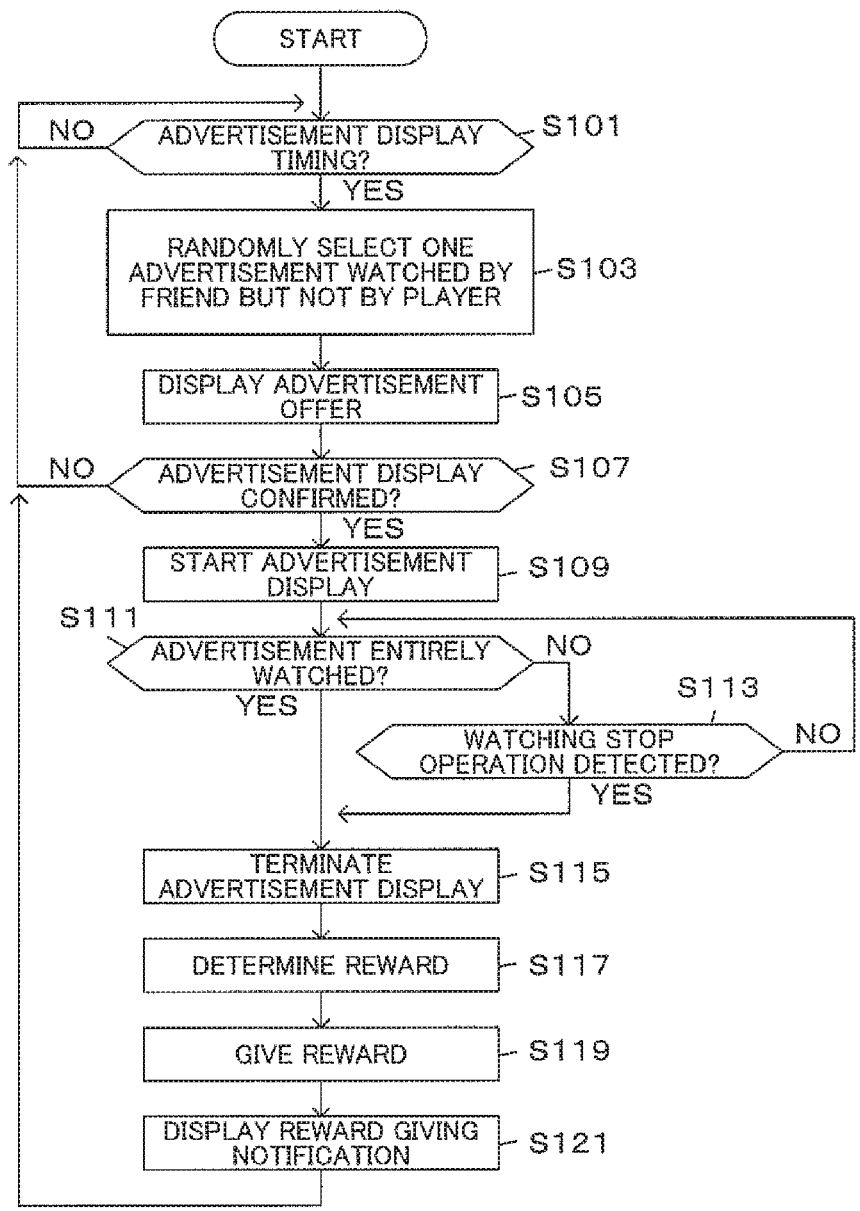
FIG. 16 is a flowchart illustrating a reward advertisement process.

FIG. 15 and FIG. 16 are flowcharts illustrating a flow of a process in the server system 1100 according to the present embodiment, from login to logout performed by a player by operating his or her user terminal 1500. In the user terminal 1500, a game program according to the present embodiment, that is, the game client program 804 is assumed to have been started to be executed with the gameplay start operation by the player and thus is assumed to have been booted.

First of all, the server system 1100 executes a login process in accordance with a request from the user terminal 1500 (step S1). As a result, the play data 410 is generated (see FIG. 13). At this point, the gameplay has not technically started, and thus the game progress control data 416 is not generated. The offer display control data 418, the advertisement display control data 420, and the reward giving notification display control data 422 are not also generated at this point. The copy of the advertisement watching history data 380 and the reward acquisition history data 400 of the user management data 360 on the player is provided as the advertisement watching history data 380 and the reward acquisition history data 400 in the play data 410.

When the login process is successfully completed, the server system 1100 then displays a menu on the user terminal 1500 (step S3). In the present embodiment, the contents of the menu displayed, which can be set as appropriate, includes friend management, play start, and logout. The content may further include online shopping, equipment change/item management (for player character), and chat with friend, for example.

When an operation to select "friend management" on the menu screen is detected (YES in step S5), the server system 1100 performs a friend management process to register or delete a friend (step S7).

When an operation to select play start on the menu screen is detected (YES in step S9), the server system 1100 starts the game progress control for implementing the gameplay using a player character (step S11), and subsequently performs the reward advertisement process (step S13) (see FIG. 16).

When the gameplay is completed (YES in step S15), the server system 1100 terminates the reward advertisement process being executed (step S17). Then, the server system 1100 updates the save data 390 (see FIG. 12), the advertisement watching history data 380, and the reward acquisition history data 400 in the user management data 360 on the player (step S19). The advertisement watching history data 380 and the reward acquisition history data 400 are updated based on the advertisement watching history data 424 and the reward acquisition history data 426 in the play data 410.

When an operation to select "logout" on the menu screen is detected (YES in step S21), the server system 1100 performs a logout process for the player (step S23) to terminate a series of processes related to the player.

FIG. 16 is a flowchart illustrating a flow of the reward advertisement process according to the present embodiment. In this process, first of all, the server system 1100 searches for the advertisement defining data 320 satisfying the timing condition 326 (see FIG. 9). When the corresponding advertisement defining data 320 is found (YES in step S101), one advertisement that has been watched by the friend player but has not been watched by the target player is selected randomly from the corresponding advertisements (step S103). The offer display section 10 for the selected advertisement is displayed. Thus, the confirmation operation/denying operation by the player for the advertisement display, and the selection operation for the advertisement display size are received (step S1.05). As a result, the offer display control data 418 related to the offer display section 10 (see FIG. 13) is generated in the play data 410.

When the advertisement display is denied (NO in step S107), displaying of the offer display section 10 is cancelled and the process returns to step S101. If no operation input is detected within a predetermined period of time after the offer display section 10 has been started to be displayed, displaying of the advertisement is automatically regarded as being denied.

When the advertisement display is confirmed (YES in step S107), the server system 1100 cancels the displaying of the offer display section 10, deletes the offer display control data 418, and instead starts to display the advertisement display 20 for the advertisement selected in step S103 (step S1.09). As a result, the advertisement display control data 420 (see FIG. 13) is generated in the play data 410.

When the advertisement display 20 that has been started to be displayed is entirely watched (YES in step S111) or when the watching stop operation by the player is detected before the advertisement display 20 is completed (YES in step S113), the server system 1100 terminates the advertisement display 20 (step S115).

Then, the server system 1100 determines a reward for watching the current advertisement (step S117). Specifically, the standard reward is determined with reference to the reward defining data 350 (see FIG. 10) indicated by the applied reward ID 340 (see FIG. 9) in the advertisement defining data 320 on the advertisement displayed. Then, the reward change setting data 358 in the advertisement defining data 320 is referred and whether or not each change executing condition 358a (see FIG. 11) in the reward change setting data 358 is satisfied is determined one by one. The change based on the changed content 358b corresponding to the change executing condition 358a satisfied is applied to the determined reward, whereby the reward to be given is determined. In this process, the reward giving notification setting data 358c corresponding to the satisfied change executing condition 358a is accumulated as the reward giving notification display control data 422 in the play data 410 to be used later for displaying the changed reason notification section 36 in the reward giving notification 30.

Then, the server system 1100 performs the control to give the reward thus determined to the player (step S119). As a result, new reward acquisition history data 400 (see FIG. 13) is generated in the play data 410. Then, the server system 1100 displays the reward giving notification 30 (step S121). Then, the process returns to step S101, and a similar process is repeated.

[Operation and Effect]

In the present embodiment described above, a reward to be given in exchange for watching an advertisement displayed in a game can be changed in accordance with whether or not the friend player has watched the advertisement. Specifically, different rewards can be obtained by watching the same advertisement, in accordance with whether or not the friend player has watched the advertisement, whereby a player can be incentivized to watch a reward advertisement. A notification indicating whether or not the friend player has watched the advertisement option is issued, so that the target player can be more interested in the advertisement to be more likely to watch the advertisement and can be expected to talk about the advertisement with the friend player.

Second Embodiment

Next, a second embodiment of the present invention is described. The present embodiment is implemented to be basically the same with the first embodiment, but is different from the first embodiment in that the user terminal 1500 performs the game management process. Components that are the same as the counterparts in the first embodiment are denoted with the same reference numerals, and the description thereof will be omitted.

Figure 17:
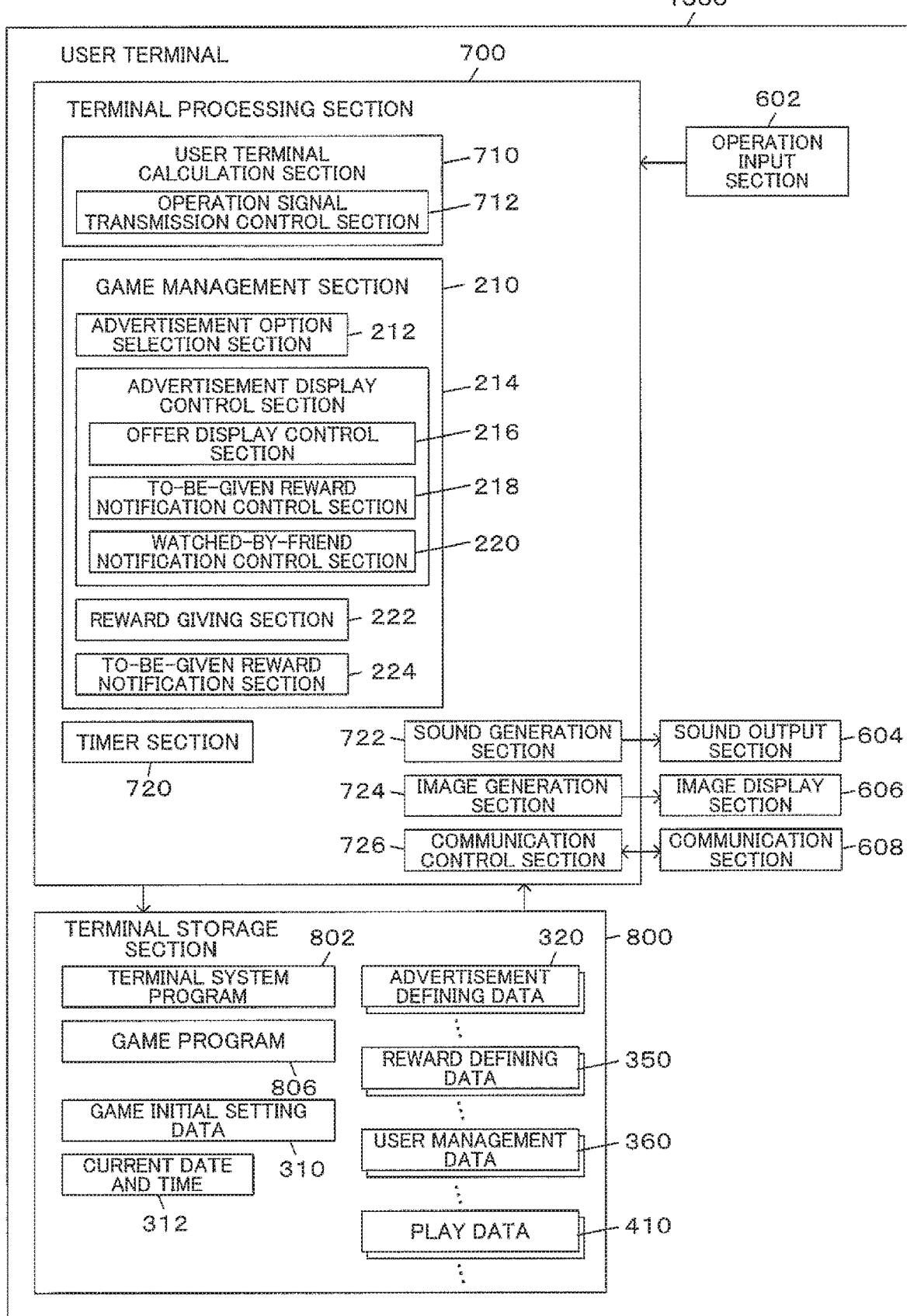
FIG. 17 is a diagram illustrating an example of a functional configuration of a user terminal according to a second embodiment.

FIG. 17 is a functional block diagram illustrating an example of a functional configuration of a user terminal 1500B according to the present embodiment. The user terminal 1500B according to the present embodiment is a computer system including the game management section 210 included in the server system 1100 according to the first embodiment. Specifically, the user terminal 1500E according to the present embodiment does not acquire data for displaying a game screen image or data for playing sounds from the server system 1100, but performs a calculation process related to the game management to perform the game progress control, and thus generates images of the game screen and an advertisement and controls the sound play therefor.

The terminal storage section 800 stores therein the terminal system program 802 and the game program 806. Thus, as the user terminal 1500B processes the game management section 210, the game initial setting program 310, the advertisement defining data 320, the reward defining data 350, and the play data 410 are stored in the terminal storage section 800. The game program 806 is a program that causes the terminal processing section 700 to implement the user terminal calculation section 710 and the game management section 210 according to the present embodiment.

A flow of the process according to the present embodiment is basically the same as the flow of the process (see FIG. 15 and FIG. 16) performed by the server system 1100 according to the first embodiment. The user terminal 1500B implements the game management section 210, and thus the subject of each step may be changed to the user terminal 1500B as appropriate. When the user terminal 1500B performs a process requiring the user management data 360 to be referred to/changed, the server system 1100 is requested to provide required data, perform matching, or the like or may be requested to perform the entire process as appropriate.

The present embodiment can provide the same advantageous effect as the first embodiment. The user terminal 1500E may be partially in charge of the functions of the game management section 210, instead of being entirely in charge of the functions.

[Modifications]

The embodiments to which the invention is applied have been described above. Note that the invention is not limited thereto. Various modifications may be made as appropriate, such as adding other elements, omitting some of the elements, or changing some of the elements.

(A) Friends

For example, in the embodiment described above, a condition for selecting an advertisement to be offered or a condition for changing a reward for watching the advertisement can be based not only on a friend registered by the target player, and may also be based on whether or not an advertisement has been watched by other players related in some ways with the target player in the gameplay, such as other players who have played against the target player in the past or other players who have been team mates with the target player in the past.

(B) Reward Change

The reward may be changed in accordance with a condition of changing the reward based on time elapsed after a friend has watched the advertisement.

(C) Advertisement Display in Accordance with Game Progress Status

An advertisement corresponding to a game progress status may be displayed. Specifically, the timing condition 326, set in the advertisement defining data 320 (see FIG. 9), is set to include a game progress status condition and a player condition. The player condition is a condition for designating the target player, and includes a possessed item condition in which an item that should be possessed by the player and the number of the items the player should be possessing.

By setting these timing conditions 326, a desired advertisement can be offered in a status desirable by a sponsor for example. For example, the advertisement defining data 320 on an item useful for a battle against a boss, such as a special healing item with high healing performance and an item for strengthening a weapon, may be set to include the timing condition 326 including a game progress status condition set to be "before a special game stage for fighting with a boss character starts", and a player condition set to be "the number of possessed item related to the advertisement is equal to or smaller than a predetermined number". Thus, an advertisement for an object that is advantageous or useful (for example, a special healing item or a strengthened weapon item useful in a battle against the boss) to be bought for the player in the current status before fighting the boss, and an advertisement for items (real items that cannot be used in the game) related to a character to appear in the battle against the boss to start can be displayed.

(D) Select from a Plurality of Advertisement Offers

Figure 18:
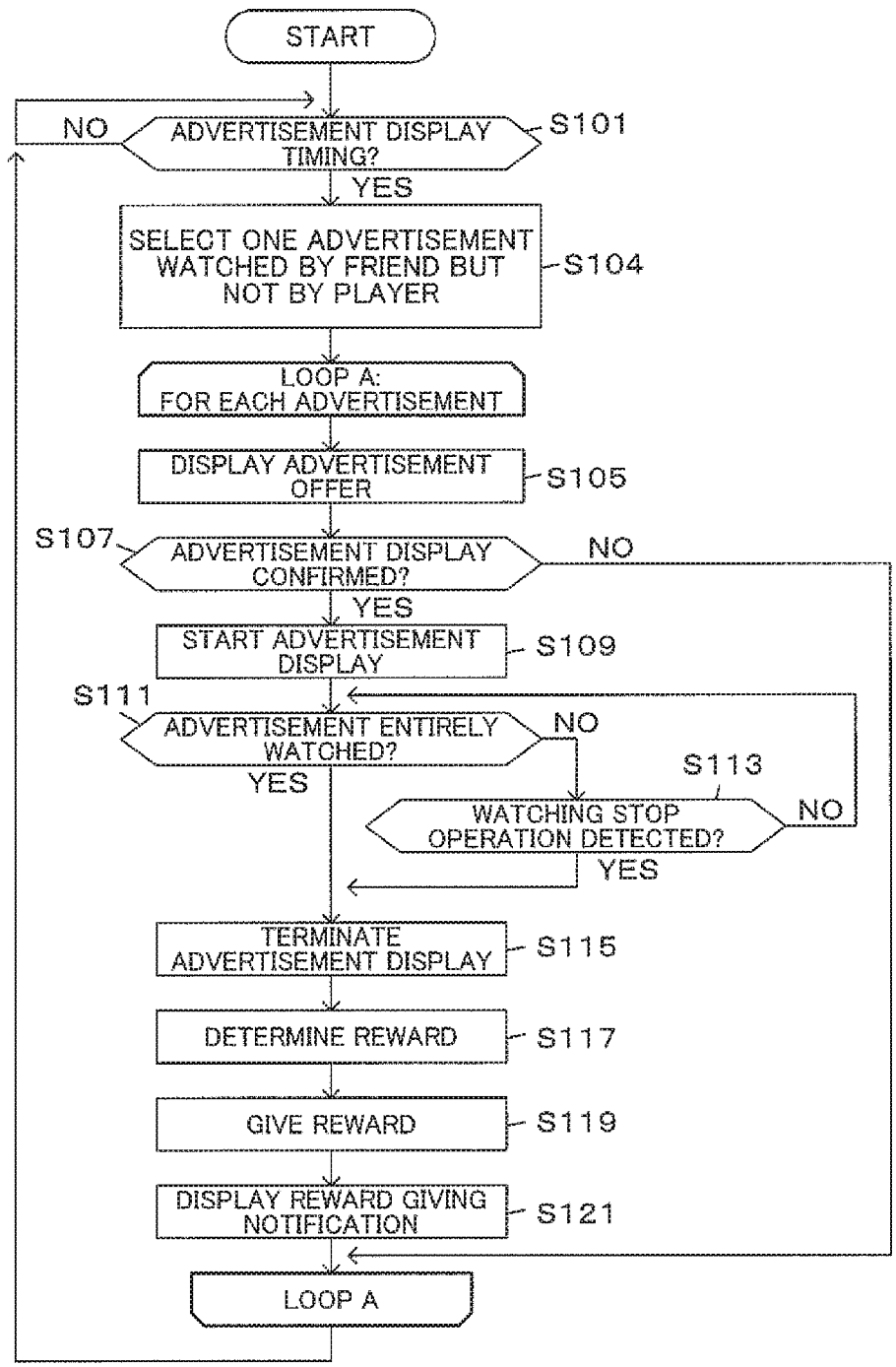
FIG. 18 is a flowchart illustrating a modification of the reward advertisement process.

In the embodiments described above, only a single advertisement is offered at a single offer timing. Alternatively, a configuration of offering a plurality of advertisements in such a status may be employed. Specifically, as in a reward advertisement process B in FIG. 18, all the advertisements that have been watched by the friend player but not watched by the target player are selected from the advertisements satisfying the timing condition 326 (step S104). Thus, a configuration of performing the loop A (steps S105 to S121) for each advertisement selected may be employed. Alternatively, an offer at the offer timing may be terminated at a point where one of a plurality of offers results in the player watching the advertisement.

In this configuration, the player can freely select and watch the advertisement he or she wants to watch. This provides an opportunity for the sponsors to have an advertisement with a length suitable for the player's mood and status selected. Thus, the sponsor can prepare a plurality of movie advertisements for the same product and with different watching times (for example, 15 seconds and 90 seconds), and may set different standard rewards and the same timing condition 326 to the advertisements. Thus, the player can select and watch the advertisement with preferable watching time at the same advertisement offer tuning. Thus, the advertisement is more likely to be watched.

(E) Reward Selection

Figure 19:
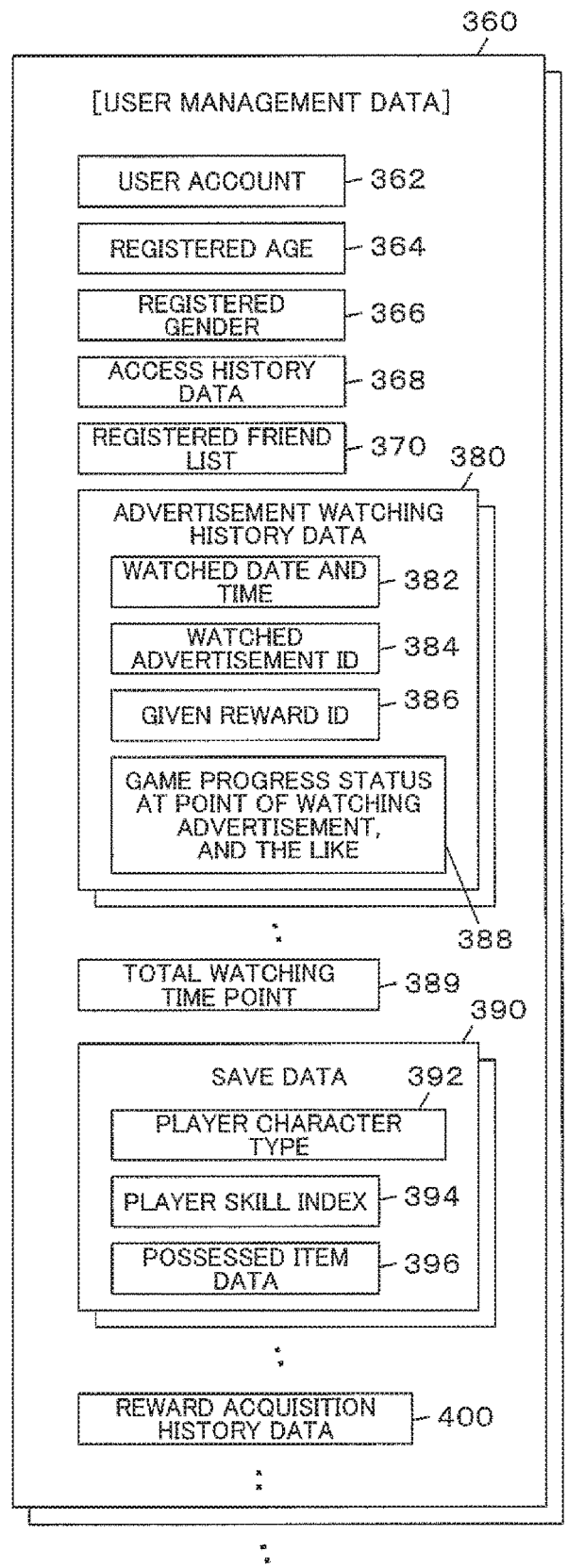
FIG. 19 is a diagram illustrating a modification of the user management data.

The configurations described in the embodiments described above uniquely set the detail of the standard reward for each advertisement. Alternatively, a configuration where the player can set the detail may be employed. Specifically, as illustrated in FIG. 19, in the configuration, a total watching time point 389 is automatically updated each time the advertisement watching history data 380 is added to the user management data 360. The total times or the total period of time the advertisement has been watched by the player in the past may be directly used as the total watching time point 389, or the total watching time point 389 may be calculated based on the total times or the total period of time.

Figure 20:
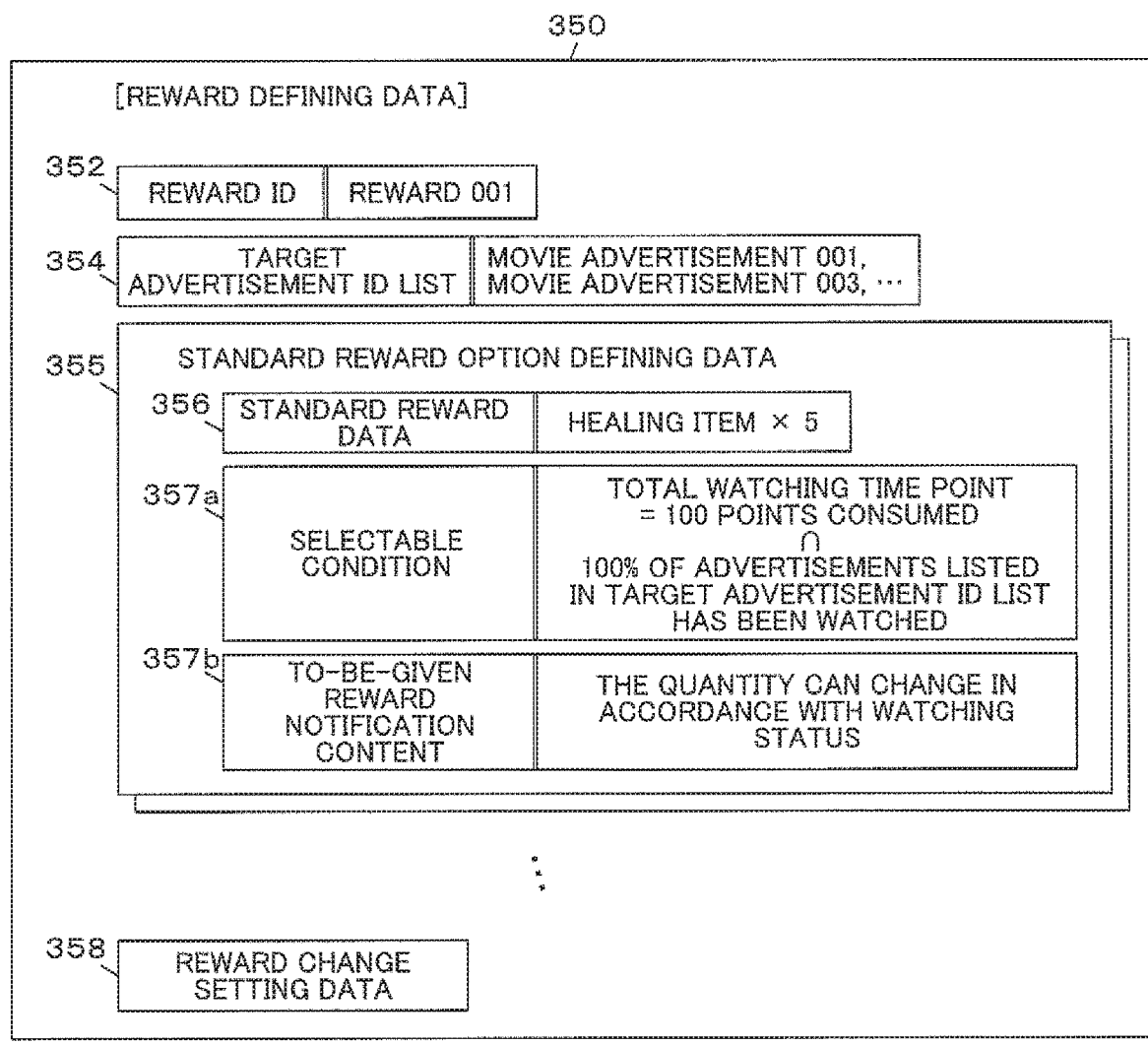
FIG. 20 is a diagram illustrating a modification of the reward defining data.

As illustrated in FIG. 20, a plurality of pieces of standard reward option defining data 355 are prepared in the reward defining data 350. The pieces of standard reward option defining data 355 each include standard reward data 356, a selectable condition 357a, and a to-be-given reward notification content 357b, and are set to be different from each other in the content of the standard reward data 356 and the selectable condition 357a.

The selectable condition 357a is a condition related to the advertisement watching history of the player in the past. For example, the condition may be defined with the consumption of the total watching time point 389, the number of the advertisements that has been watched in the advertisements listed in the target advertisement ID list 354 or the amount of the already-watched advertisement, and the like. In the illustrated example, an example of an AND condition of these two elements is employed. Alternatively, an OR condition may be employed.

The value of the content of the standard reward is preferably increased for the selectable condition 357a that is relatively more difficult to satisfy (for example, "100% of advertisements listed in the target advertisement ID list 354 has been watched" as illustrated in FIG. 20). For example, the content of the standard reward of the selectable condition 357a that is relatively difficult to satisfy may be preferably be a combination of a plurality of or all of the contents of the standard rewards of the selectable conditions 357a that are relatively easy to satisfy.

Figure 21:
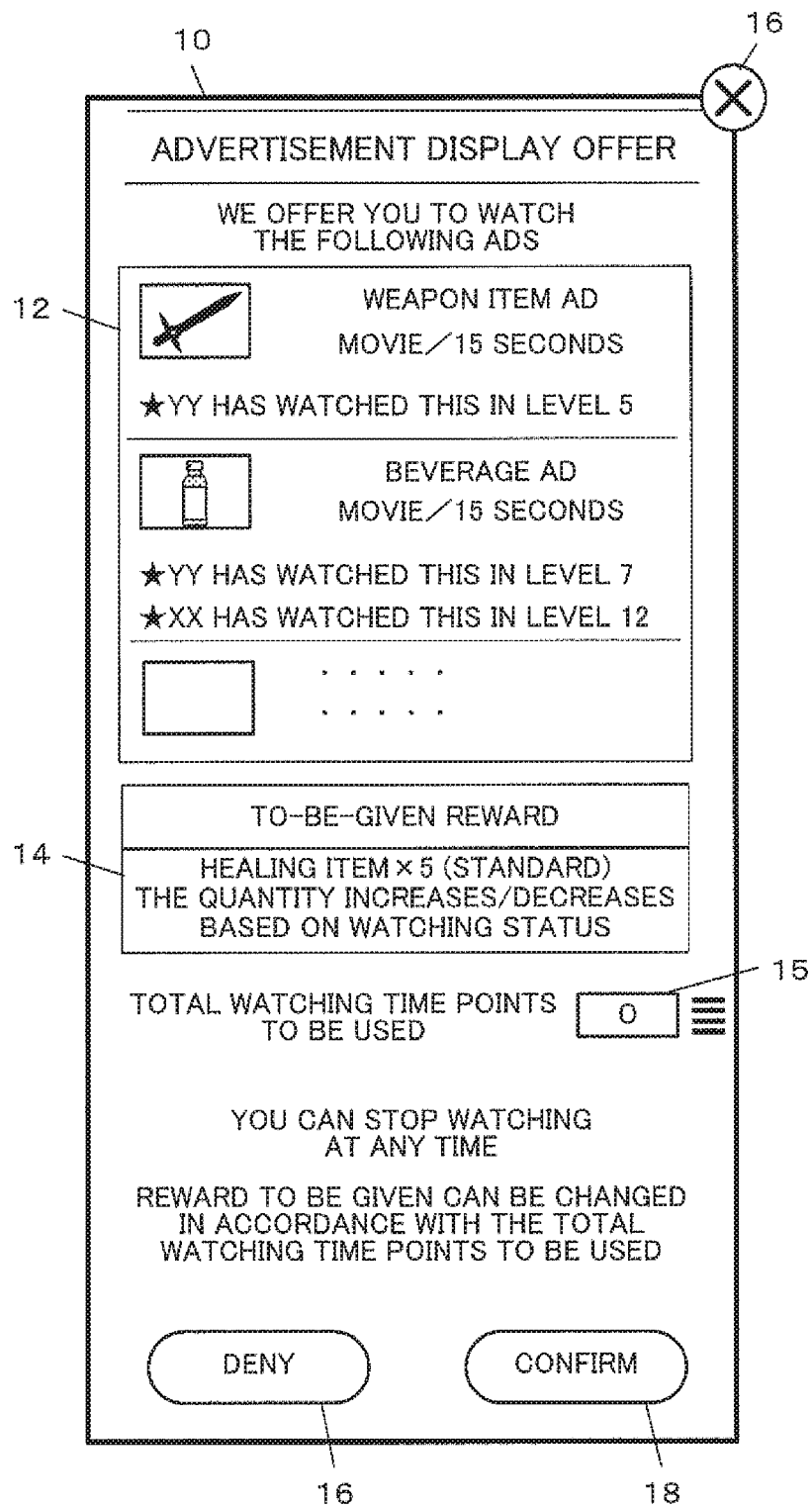
FIG. 21 is a diagram illustrating a modification of the offer display section.

As illustrated in FIG. 21, a used point amount designation section 15 for designating the used amount of the total watching time point is added to the offer display section 10.

In the reward advertisement process (see FIG. 16), when an advertisement offer is displayed (step S105), control is also performed for selecting one standard reward option defining data 355 satisfying the selectable condition 357a including the used amount of the total watching time point designated with the used point amount designation section 15 in the offer display section 10, and displaying the corresponding reward giving notification content 357b on the offer display section 10. Then, when the reward is determined (step S117), the content of the standard reward corresponds to the standard reward data 356 in the standard reward option defining data 355 for which the displaying has been confirmed in step S107.

(F) Reward Change Based on Lottery

Alternatively, a configuration of setting the content of the standard reward may be set to that involving lottery (for example, a lottery for determining whether or not to give the standard reward, or setting the ability parameter value of the character, serving as the standard reward, is set to be especially higher when the player wins the lottery).

Specifically, when a reward is determined (step S117) in the reward advertisement process (see FIG. 16), a lottery is performed based on the total watching time point of the player to determine the standard reward. Specifically, the chance of winning the lottery for the standard reward associated with the displayed advertisement (that is a possibility of the reward being given to the player) is variably set. Then, the standard reward may be determined with a lottery process performed based on the chance of winning thus set. A plurality of standard rewards may be associated with one advertisement, and a chance of winning each of the plurality of standard rewards, associated with the displayed advertisement, may be variably set in accordance with the total watching time point, and the standard reward may be determined through a lottery based on the change of winning thus set. Alternatively, one standard reward may be associated with one advertisement, and the given quantity and the parameter of the standard reward may be determined through a lottery based on the total watching time point.

(G) Game Implementation

In the example according to the first embodiment, the entire game system is implemented with a client-server system. However, this should not be construed in a limiting sense. For example, a computer system in which a plurality of user terminals 1500 can establish a peer-to-peer (P2P) connection may be implemented for a battle game. Specifically, the server system 1100 provides data as a matching result to the user terminals 1500 matched by the server system 1100, and then the user terminals establish the P2P connection. One of the user terminals 1500 is in charge of the functions of the game management section 210. Alternatively, a plurality of user terminals 1500 may cooperate to implement the functions.

(H) Game System

The system according to the examples described in the embodiments described above includes the server system 1100 and the plurality of user terminals 1500. Alternatively, the present invention may be similarly applied to a game system including a single computer. For example, the present invention may be applied to a single game device.

Figure 22:
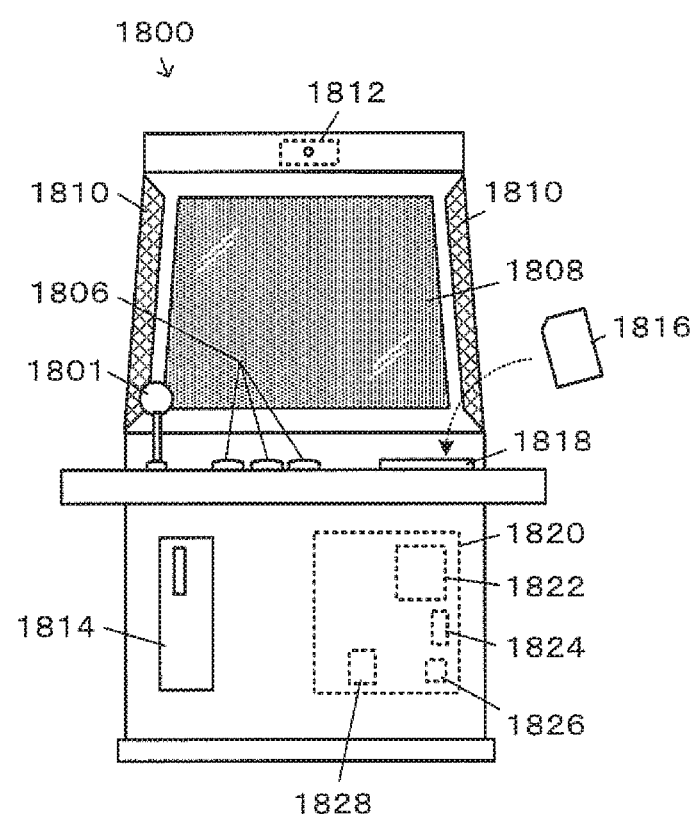
FIG. 22 is a diagram illustrating an example of a configuration of an arcade game device employing the present invention.

Specifically, FIG. 22 is an outer front view illustrating an example of a configuration of an arcade game device 1800 employing the present invention. The arcade game device 1800 includes a casing main body 1802 provided with operation input units, used by the player to input operations, including: a joystick 1804; a button switch 1806; and a touch panel 1808 that functions as an image display device and as a touch position input device. The casing main body 1802 is further provided with a speaker 1810, a player image capturing camera 1812, a payment device 1814, a medium reading device 1818 for writing and reading data to and from an electronic payment medium 1816, and a control board 1820.

The control board 1820 includes various processors (e.g., a CPU 1822, a GPU, and a DSP), various IC memories 1824 (e.g., a VRAM, a RAM, and a ROM), a communication device module 1826 for establishing communication connection with the communication line N, an I/F controller 1828 (interface controller), and the like.

For example, the I/F controller 1828 includes 1) a driver circuit for the touch panel 1808, 2) a circuit that receives a signal from the joystick 1804 and the button switch 1806, 3) an output amplifier circuit that outputs a sound signal to the speaker 1810, 4) a circuit that reads image data on an image captured by the player image capturing camera 1812, 5) a circuit for outputting and receiving a signal to and from the payment device 1814 and the medium reading device 1818, and the like.

These elements of the control board 1820 are electrically connected to each other via a bus circuit, to be capable of exchanging data and signals. The control board 1820 may be partially or entirely implemented with an ASIC, FPGA, or SoC.

The control board 1820 executes the game program to perform the calculation process, and controls each sections of the arcade game device 1800 to enable the gameplay in accordance with an operation input with the joystick 1804, the button switch 1806, and the touch panel 1808. The arcade game device 1800 has a required program and various types of setting data in the IC memory 1824 in advance. Alternatively, the program and the data may be downloaded from an external device each time the system is booted.

The control board 1820 performs control so that the arcade game device 1800 sequentially transmits the result of the operation input using the joystick 1804, the touch panel 1808, or the like to the server system 1100 and receives the various types of data for playing the game from the server system 1100. The image of the game screen is generated and displayed on the touch panel 1808, and the sound signal corresponding to the sound effects and an operation sound is generated and emitted from the speaker 1810. Thus, the player can enjoy the gameplay by operating the joystick 1804 while watching the game screen displayed on the touch panel 1808 and listening to the game sound from the speaker 1810.

In this configuration, the functions of the server system 1100 and the user terminal 1500 according to the first embodiment are implemented with the arcade game device 1800 alone. Note that the user management data 360 may be stored in the server system 1100 as in the first and the second embodiments, and data may be acquired and updated with the arcade game device 1800 issuing a request to the server system 1100 each time the acquisition or the updating is required.

What is claimed is:

1. A computer system comprising:
    a memory; and
    at least one processor or circuit programmed to execute as:
        controlling implementation of a game;
        managing advertisement watching information on each player including a target player and a friend player of the target player, the advertisement watching information including an advertisement watching history on each player;
        acquiring information on the friend player of the target player;
        selecting an advertisement option in a game to be played by the target player, wherein the advertisement option is determined based on the advertisement watching information indicating that the advertisement option has been watched by the friend player but has not been watched by the target player;
        providing an advertisement offer menu to the target player, wherein the advertisement offer menu includes at least the advertisement option and indicates that the friend player has previously watched the advertisement option, and receiving selection by the target player on whether or not to watch the advertisement option;
        determining a reward related to the game, to give to the target player, the reward being changeable based on the advertisement watching history of the friend player indicating that the friend player has previously watched the advertisement option selected by the target player; and
        determining whether the target player selected the advertisement option in the advertisement offer menu and the advertisement option was displayed to the target player, and giving the reward to the target player when the advertisement option is displayed to the target player.

2. The computer system as defined in claim 1, the determining the reward including determining the reward based on a number of friend players who have watched the advertisement option.

3. The computer system as defined in claim 1, the acquiring the information on the friend player including acquiring an intimacy index value indicating intimacy between the target player and the friend player for each of a plurality of friend players,
    the determining the reward including determining the reward based on whether or not a friend player with the intimacy index value satisfying a predetermined high intimacy condition has watched the advertisement option.

4. The computer system as defined in claim 1, the at least one processor or circuit further programmed to execute as notifying, when the advertisement option has been watched by the friend player, the target player that the friend player has watched the advertisement option.

5. The computer system as defined in claim 4, the advertisement watching information including information on a movie advertisement that has been entirely watched,
    the notifying including notifying, when the advertisement option is the movie advertisement that has been entirely watched by the friend player, the target player that the advertisement option is the movie advertisement that has been entirely watched by the friend player.

6. The computer system as defined in claim 4, the notifying including notifying the target player of a number of friend players who have watched the advertisement option.

7. The computer system as defined in claim 4, the notifying including notifying, when the advertisement option is a movie advertisement that has been entirely watched by the friend player, the target player of a number of friend players who have entirely watched the movie advertisement.

8. The computer system as defined in claim 4, the advertisement watching information including game information indicating a game progress status and/or a player status at the time of watching an advertisement,
    the notifying including notifying, when the game information of the friend player who has watched the advertisement option at the time of watching the advertisement and the game information on the target player at the time of watching the advertisement satisfy a predetermined correspondence condition, the target player that the friend player has watched the advertisement at the same time with the game information satisfying the predetermined correspondence information.

9. The computer system as defined in claim 1, the advertisement watching information including game information indicating a game progress status and/or a player status at the time of watching an advertisement,
   the determining the reward including determining the reward, when the friend player has watched the advertisement option, based on whether or not the game information of the friend player who has watched the advertisement option at the time of watching the advertisement and the game information on the target player at the time of watching the advertisement satisfy a predetermined correspondence condition.

10. The computer system as defined in claim 1, the acquiring the information on the friend player including acquiring an intimacy index value indicating intimacy between the target player and the friend player for each of a plurality of friend players, the selecting the advertisement option including selecting an advertisement that has been watched by the friend player with the index value satisfying a predetermined high intimacy condition but has not been watched by the target player, as the advertisement option.

11. The computer system as defined in claim 1, the advertisement watching information including information on a movie advertisement that has been entirely watched, the selecting the advertisement option including selecting the movie advertisement that has been entirely watched by the friend player as the advertisement option.

12. The computer system as defined in claim 10, the advertisement watching information including information on a movie advertisement that has been entirely watched,
   the selecting the advertisement option including selecting the movie advertisement that has been entirely watched by the friend player as the advertisement option.

13. The computer system as defined in claim 1, the at least one processor or circuit further programmed to execute as notifying the reward to be given when the advertisement option is watched.

14. A game system comprising: a server system that is the computer system according to claim 1; and
   a user terminal to which the player inputs an operation,
   the server system and the user terminal being connected to the game system to be capable of performing a communication with each other.

15. A computer system comprising:
   a memory; and
   at least one processor or circuit programmed to execute as:
      making a game progress based on an operation input by a target player;
      accessing a management system managing advertisement watching information on each player including the target player and a friend player of the target player, the advertisement watching information including an advertisement watching history on each player;
      selecting an advertisement option displayed in the game by the target player, wherein the advertisement option is determined based on the advertisement watching information indicating that the advertisement option has been watched by the friend player but has not been watched by the target player;
      providing an advertisement offer menu to the target player, wherein the advertisement offer menu includes at least the advertisement option and indicates that the friend player has previously watched the advertisement option, and receiving selection by the target player on whether or not to watch the advertisement option;
      determining a reward related to the game, to give to the target player, the reward being changeable based on the advertisement watching history of the friend player indicating that the friend player has previously watched the advertisement option selected by the target player; and
      determining whether the target player selected the advertisement option in the advertisement offer menu, and giving the reward to the target player when the advertisement option is displayed to the target player.

16. A method, implemented on a computer system, the method comprising: on the computer system,
   making a game progress based on an operation input by a target player;
   accessing a management system managing advertisement watching information on each player including the target player and a friend player of the target player, the advertisement watching information including an advertisement watching history on each player;
   selecting an advertisement option displayed in the game by the target player, wherein the advertisement option is determined based on the advertisement watching information indicating that the advertisement option has been watched by the friend player but has not been watched by the target player;
   providing an advertisement offer menu to the target player, wherein the advertisement offer menu includes at least the advertisement option and indicates that the friend player has previously watched the advertisement option, and receiving selection by the player on whether or not to watch the advertisement option;
   determining a reward related to the game, to give to the target player, the reward being changeable based on the advertisement watching history of the friend player indicating that the friend player has previously watched the advertisement option selected by the target player; and
   determining whether the target player selected the advertisement option in the advertisement offer menu, and giving the reward to the target player when the advertisement option is displayed to the target player.

* * * * *